United States Patent
Izawa et al.

(10) Patent No.: US 8,064,734 B2
(45) Date of Patent: Nov. 22, 2011

(54) IMAGE PROCESSING DEVICE IMAGE PROCESSING METHOD, AND COMPUTER PROGRAM

(75) Inventors: Takashi Izawa, Tokyo (JP); Kazuma Suzuki, Shizuoka (JP)

(73) Assignee: Sony Corporation, Tokyo (JP)

( * ) Notice: Subject to any disclaimer, the term of this patent is extended or adjusted under 35 U.S.C. 154(b) by 1051 days.

(21) Appl. No.: 11/934,965

(22) Filed: Nov. 5, 2007

(65) Prior Publication Data

US 2008/0152262 A1 Jun. 26, 2008

(30) Foreign Application Priority Data

Dec. 22, 2006 (JP) ................................ 2006-345298

(51) Int. Cl.
G06K 9/32 (2006.01)
(52) U.S. Cl. ....................................................... 382/300
(58) Field of Classification Search .................. 345/179, 345/414.1, 417.1, 422.1; 382/205, 209, 300, 382/308; 700/135; 706/48; 707/999.006; 715/210

See application file for complete search history.

(56) References Cited

FOREIGN PATENT DOCUMENTS

| JP | 5-94171 | 4/1993 |
|---|---|---|
| JP | 7-162750 | 6/1995 |
| JP | 8-63592 | 3/1996 |
| JP | 9-305755 | 11/1997 |
| JP | 11-146234 | 5/1999 |
| JP | 2004-4302 | 1/2004 |
| JP | 2005-301992 | 10/2005 |
| JP | 2006-3420 | 1/2006 |
| JP | 2006-3420 | * 5/2006 |

* cited by examiner

*Primary Examiner* — Gregory F Cunningham
(74) *Attorney, Agent, or Firm* — Oblon, Spivak, McClelland, Maier & Neustadt, L.L.P.

(57) ABSTRACT

An image processing device for enlarging an image includes an attribute determining unit, a pattern matching determining unit, and a data selecting unit. The attribute determining unit determines an attribute of each pixel constituting an input image. The pattern matching determining unit determines whether a pattern of the input image, constituted by a target pixel and target-pixel-neighboring pixels that are determined to have the same attribute, matches a predetermined interpolation pattern while assuming each pixels of the input image as the target pixel. The data selecting unit selects pixel data for each of N×N pixels, obtained by enlarging the target pixel N-times, on the basis of the result of the matching determination performed by the pattern matching determining unit, where N is an integer equal to or greater than 2.

11 Claims, 24 Drawing Sheets

PATTERN MATCHES

INTERPOLATE/ENLARGE

ADJACENT PIXEL INTERPOLATION

INTERPOLATION WITH PIXEL DATA OF UPPER ADJACENT PIXEL

LEFT END OF IMAGE

INTERPOLATION WITH PIXEL DATA OF LEFT ADJACENT PIXEL

UPPER END OF IMAGE

| U2L2 | U2L1 | U2C0 | U2R1 | U2R2 |
|------|------|------|------|------|
| U1L2 | U1L1 | U1C0 | U1R1 | U1R2 |
| M0L2 | M0L1 | M0C0 | M0R1 | M0R2 |
| D1L2 | D1L1 | D1C0 | D1R1 | D1R2 |
| D2L2 | D2L1 | D2C0 | D2R1 | D2R2 |

PATTERN 1  PATTERN 2  PATTERN 3

PATTERN 4  PATTERN 5

INTERPOLATION WITH PIXEL DATA OF UPPER ADJACENT PIXEL

INTERPOLATION WITH PIXEL DATA OF LEFT ADJACENT PIXEL

← 732

← 722

FIG. 8A
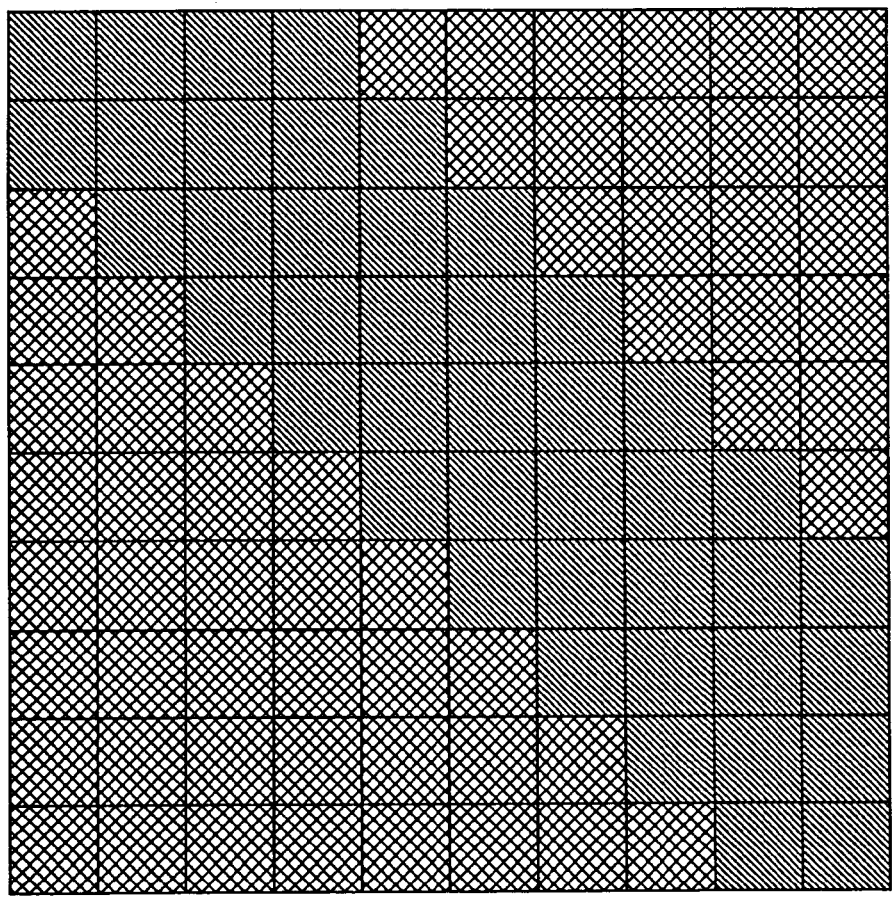
INTERPOLATED AND ENLARGED IMAGE
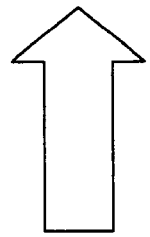
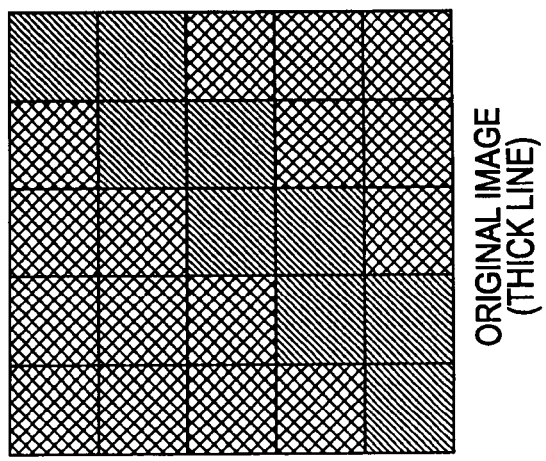
ORIGINAL IMAGE (THICK LINE)

FIG. 8B
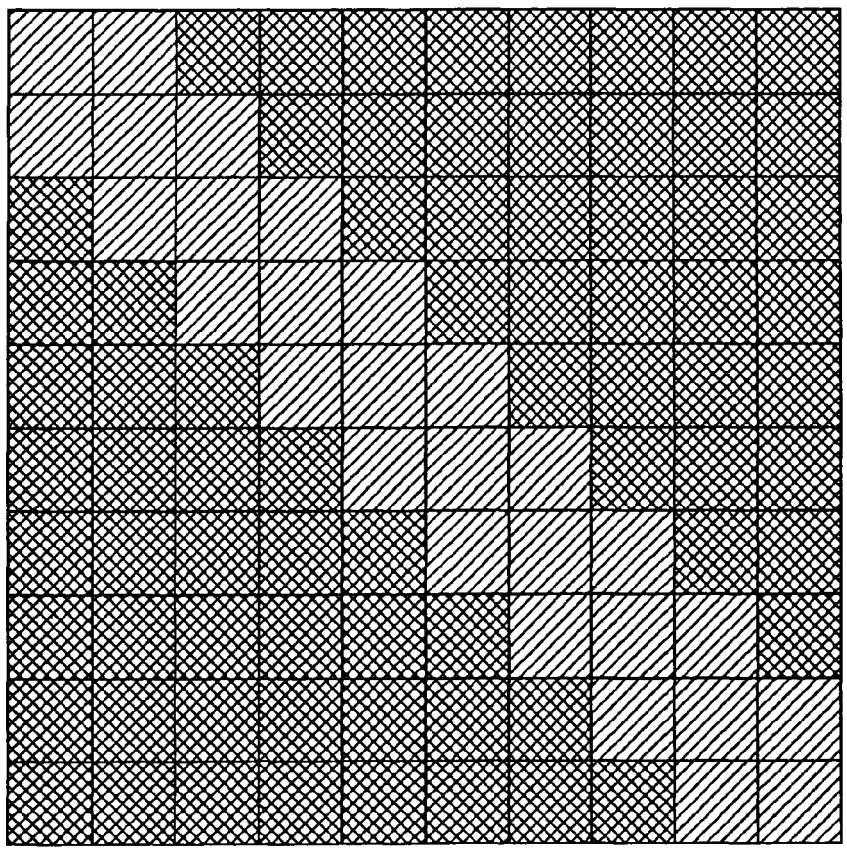
INTERPOLATED AND ENLARGED IMAGE
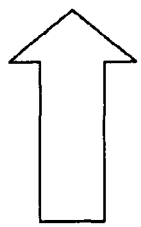
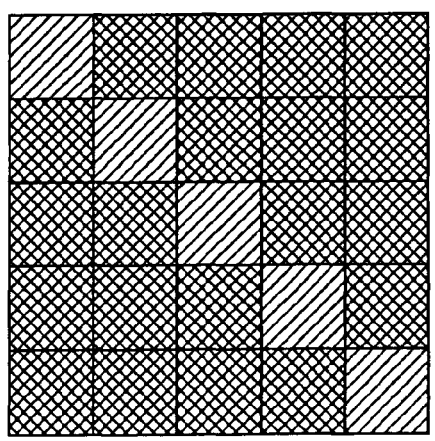
ORIGINAL IMAGE (THIN LINE)

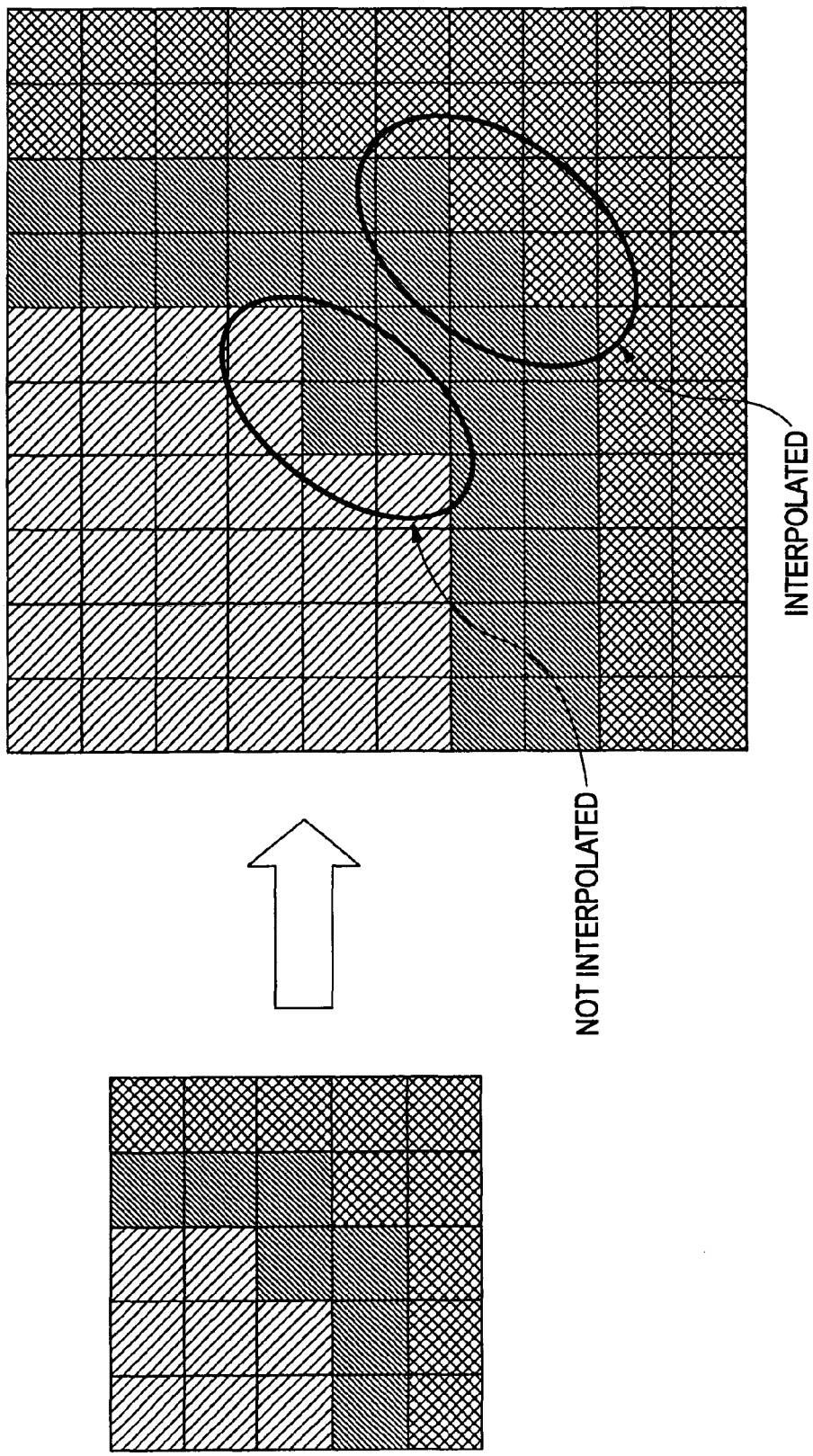

IMAGE PROCESSING DEVICE IMAGE PROCESSING METHOD, AND COMPUTER PROGRAM

CROSS REFERENCES TO RELATED APPLICATIONS

The present invention contains subject matter related to Japanese Patent Application JP 2006-345298 filed in the Japanese Patent Office on Dec. 22, 2006, the entire contents of which are incorporated herein by reference.

BACKGROUND OF THE INVENTION

1. Field of the Invention

The present invention relates to image processing devices for displaying digital images, image processing methods, and computer programs for the same. In particular, the present invention relates to image processing devices for enlarging digital images to cope with an increase in resolution and an increase in the size of displays, and image processing methods, and computer programs for the same.

More specifically, the present invention relates to an image processing device for performing on-screen display, which includes icons and characters, on a large display, an image processing method, and a computer program for the same. In particular, the present invention relates to an image processing device for enlarging an on-screen display area while maintaining the display quality, an image processing method, and a computer program for the same.

2. Description of the Related Art

With the current increases in the resolution of displayed images and in the size of displays, processing for enlarging digital images has become a significantly important technique.

The digital images can be mainly categorized into the following two types.

One type is natural images captured with image pickup devices, such as cameras, and recorded or transmitted. The other type is artificial images, such as graphics and character texts, generated with computers.

Methods for enlarging or reducing images using an interpolation filter based on a sampling theorem, such as bilinear interpolation or cubic interpolation, are generally employed for natural images. These image processing methods can provide high-quality enlarged images, regarding natural images that have multilevel data and that include, in principle, a noise.

On the other hand, when artificial images are enlarged using the above-described interpolation filter, edges of characters or the like are dulled, due to which high-quality enlarged images may not be obtained. In particular, for bilevel images, such as character texts, enlargement processing is often performed using the nearest neighbor interpolation in order to avoid the blur resulting from such dulled edges. However, the jaggy (serration observed on a contour of an image) becomes problematic in terms of visual sensation in the enlargement processing using the nearest neighbor interpolation.

In addition, recently more and more complex video images have been handled in artificial images. In such a case, a mismatch undesirably occurs in a combined image of an enlarged character text and another artificial image if the character text is enlarged appropriately only using data matching or the like.

On-screen display (OSD) of an operation screen for screen setting that appears on a display can be given as an example of artificial images to be displayed over a digital image. The OSD function is used as a user interface to media that stores various kinds of image information, and is executed in a format that indicators, such icons or characters representing a device status and an operation condition, are superimposed on a main image. In such a manner, the OSD function allows an operation mode of the device to be displayed as an icon or a device operation guidance to be displayed.

For example, digital cameras are widespread as media that store image information. Digital cameras provide a mode for reproducing and displaying image data stored in a memory card and a mode for displaying through images to be captured. It is known that digital cameras combine image data with character data, representing a counter value, a date, and a photographing condition, on an LCD (Liquid Crystal Display) panel, which is a display device, to perform on-screen display (see, for example, Japanese Unexamined Patent Application Publication No. 11-146234).

In addition, an on-screen controller has been suggested (see, for example, Japanese Unexamined Patent Application Publication No. 7-162750). From the viewpoint that on-screen images should be displayed in a relatively easy-to-see size and at a relatively easy-to-see position on a display, the on-screen controller includes means for enlarging or reducing a character or a pattern to a given size, means for displaying the character or the pattern at a given position, and an operation unit having a key for enlarging and reducing the character or the pattern to a given size and a key for moving the character or the pattern to a given position. The on-screen controller allows the character or the pattern to be displayed in the given size and at the given position through operations performed on the keys.

Additionally, the noticeability of on-screen images can be improved by increasing the size of displayed icons related to user settings. For example, a display-equipped electronic apparatus has been suggested (see, for example, Japanese Unexamined Patent Application Publication No. 2005-301992). The display-equipped electronic apparatus detects a change in an apparatus status or a change in a setting of an operation condition, assigns an icon indicating the apparatus status or the operation condition for which the change is detected, and performs on-screen display in a shape different from the icon assigned before.

As described above, since opportunities for enlarging artificial images superimposed on natural images are increasing mainly in products, such as digital cameras, obtainment of enlarged artificial images having a quality that is the same as high-resolution multilevel natural images is desired. Hitherto, techniques for performing enlargement processing on image data having relatively less grayscale levels, such as character texts of artificial images, have been suggested.

For example, an outline font generating method has been suggested (see, for example, Japanese Unexamined Patent Application Publication No. 5-94171). In this method, character fonts of both of basic characters and enlarged characters are stored beforehand, and several kinds of pattern matching are performed on the enlarged character patterns to generate an enlarged character. This method undesirably requires a mass memory to store the font data. In addition, since this method includes two processing paths of enlargement processing and interpolation processing, which are generating an enlarged character from basic character font data and then performing interpolation on this enlarged character, a processing time and a cost for hardware increase.

In addition, a method for scaling bilevel images using the piecewise polynomial interpolation has been suggested (see, for example, Japanese Unexamined Patent Application Publication No. 8-63592). However, this method undesirably requires a ROM storing a vast number of patterns, otherwise the quality of enlarged images becomes low with a small number of patterns. Additionally, the method requires complex arithmetic processing, which results in an increase in a processing time and an increase in a cost of hardware.

Furthermore, a smoothing method performed at the time of enlarging characters and figures has been suggested (see, for example, Japanese Unexamined Patent Application Publication No. 9-305755). In this case, complex arithmetic processing is needed, which results in an increase in a processing time and an increase in a cost of hardware.

Moreover, a font generating system that employs a genetic algorithm has been suggested (see, for example, Japanese Unexamined Patent Application Publication No. 2004-4302). In this case, complex arithmetic processing is needed, which results in an increase in a processing time and an increase in a cost of hardware.

All of the methods described above basically target at bilevel graphic images, but are incapable of coping with text enhancement, such as outlines and shadowed characters.

Additionally, a method for enlarging characters using pattern matching has been suggested (see, for example, Japanese Unexamined Patent Application Publication No. 2006-3420). Although this method allows a target pattern to be enlarged to a high quality image, an unnatural pattern may be caused when a complex artificial image is combined with a background image.

SUMMARY OF THE INVENTION

It is desirable to provide an image processing device and an image processing method capable of enlarging digital images to cope with an increase in resolution and an increase in the size of displays, and a computer program for the same.

It is also desirable to provide an image processing device and an image processing method capable of performing on-screen display, which includes icons and characters, on a large display, and a computer program for the same.

Additionally, it is desirable to provide an image processing device and an image processing method capable of enlarging artificial image, such as an on-screen display area, while maintaining the display quality, and a computer program for the same.

Furthermore, it is desirable to provide an image processing device and an image processing method capable of performing enlarging processing without causing a mismatch in a combined image of an artificial image, such as an on-screen display area, and another artificial image, and a computer program for the same.

Moreover, it is desirable to provide an image processing device and an image processing method capable of performing enlarging processing on enhanced character texts, such as outlines and shadowed characters, and on relatively complex artificial images, and a computer program for the same.

In view of the above-described disadvantages, an image processing device for enlarging an image according to a first aspect includes an attribute determining unit for determining an attribute of each pixel constituting an input image, a pattern matching determining unit for determining whether a pattern of the input image, constituted by a target pixel and target-pixel-neighboring pixels that are determined to have the same attribute, matches a predetermined interpolation pattern while assuming each pixel of the input image as the target pixel, and a data selecting unit for selecting pixel data for each of N×N pixels, obtained by enlarging the target pixel N-times, on the basis of the result of the matching determination performed by the pattern matching determining unit, where N is an integer equal to or greater than 2.

With the current increases in the resolution of displayed images and in the size of displays, processing for enlarging digital images has become a significantly important technique. The digital images can be mainly categorized into natural images and artificial images, such as graphics and character texts. Regarding natural images, processing methods for enlarging and reducing images are established. On the contrary, regarding artificial images, there are disadvantages of dulling of edges caused at the time of enlargement and the blur resulting therefrom, and the jaggy is seen even if the nearest neighbor interpolation is employed.

Currently, smoothing methods employed when characters and figures are enlarged have been suggested. However, all of these methods have a disadvantage that a processing time and a cost of hardware increase. In addition, the methods do not fully deal with various attributes of an artificial image, such as differences in text enhancements of outlines and shadowed characters.

On the contrary, in the image processing device according to the embodiment of the present invention, the attribute determining unit first determines an attribute of each pixel of an input image. The input image is an artificial image, such as a character or a figure, to be superimposed on a video signal captured with, for example, a camera.

The attribute determining unit determines whether or not each pixel of the input image has an attribute indicating the artificial image. Subsequently, the pattern matching determining unit determines whether a pattern, constituted by a target pixel and target-pixel-neighboring pixels that are determined to have the same attribute, matches a predetermined interpolation pattern while assuming each pixels of the input image as the target pixel. The data selecting unit then selects whether to assign original pixel data of the target pixel to pixel data of each of the N×N pixels, obtained by enlarging the target pixel N-times, or to interpolate the pixel data of each of the N×N pixels with pixel data of an adjacent pixel.

After determining the pixel data of each pixel having undergone the interpolation and enlargement processing, the color code of each pixel is converted into pixel data in RGB or YCrCb using a color palette. The image combining unit then superimposes the input image having been converted into the image data on a video signal captured with a camera or the like, thereby generating an on-screen image.

The attribute determining unit may determine a plurality of attributes regarding artificial images and the plurality of attributes may be categorized into attribute groups. In such a case, the pattern matching determining unit may prepare interpolation patterns for each attribute group, and may determine matching of the pattern of the input image using the interpolation patterns corresponding to the attribute group to which the attribute determined for the target pixel belongs to.

For example, by categorizing color codes of pixel data constituting an artificial image according to ranges of addresses corresponding to attribute groups, the attribute determining unit can easily determine the attribute group for each pixel on the basis of the address range of the color code of each of the pixels of the input image. More specifically, addresses of color codes are categorized for each attribute group of an artificial image, such as a foreground group (for thick character), a foreground group (for thin character), a background group, and an outline group. The attribute determining unit determines the attribute on the basis of the address of the color code of each pixel of the input image.

In such a case, the pattern matching determining unit selects interpolation patterns to be used in the pattern matching according the result of determining the attribute of the target pixel performed by the attribute determining unit, and determines whether or not the pattern matches. Even if the attribute determination results of the target pixel and neighboring pixels thereof are the same patterns, a method of selecting an interpolation pixel at the time of enlargement of the target pixel changes depending on types of the attribute groups. Thus, the enlargement processing is performed while adaptively switching the interpolation method according to the attribute group.

Particularly in enlargement processing of an artificial image targeting at a character, the image processing device according to the embodiment of the present invention can select an optimum enlarging processing method (or an optimum pixel interpolation method used in the enlargement of pixel) according to the attribute of the target pixel by determining the attribute on the basis of the color code value. The processing method may be processing for thick lines, processing for thin lines, processing for outlines, or processing for the background. Needless to say, in enlargement processing of an on-screen image of a complex artificial image including not only characters, the image processing device according to the embodiment can improve the quality of a background image and the quality of outlined characters as well as the quality of characters with a small memory capacity.

Japanese Unexamined Patent Application Publication No. 2006-3420 has also suggested a method for enlarging images using pattern matching as described above. However, since the image processing device and the image processing method according to the embodiment of the present invention adaptively switch the interpolation method according to the attribute of the target pixel, the image processing device and the image processing method can enlarge the target pattern into a high-quality image and can suppress generation of an unnatural pattern when a complex artificial image is combined with a background image.

The pattern matching determining unit can further define a priority relationship between attribute groups when switching interpolation methods for each attribute group. For example, suppose that a priority relationship that an attribute group 2 has priority over an attribute group 1 is defined. In such a case, when a target pixel belongs to the attribute group 2, the attribute group 1 is not treated as the other group. On the other hand, when the target pixel belongs to the attribute group 1, the attribute group 2 can be treated as the same group.

In such a case, a target pixel for which matching is determined in ordinal pattern matching is categorized into an interpolation target. On the other hand, a case where target pixel may be determined to mismatch and may be excluded from the interpolation target by defining a priority relationship between attribute groups and different interpolation and enlargement processing is applied is expected. Needless to say, depending on images and patterns, the opposite, i.e., pattern to be determined to mismatch in ordinary pattern matching may be determined to match by defining a priority relationship between attribute groups and may be determined to be an interpolation target.

Accordingly, definition of a priority relationship between attribute groups allows control of whether or not to interpolate only an attribute group corresponding to background to be easily performed. In addition, since color codes are categorized by ranges of addresses, constraints that fonts are preferentially interpolated over graphics or that an outline portion of fonts has priority over a character portion thereof the can be provided.

A range for which whether an image matches a pattern is determined may run off the edge of the image. In such a case, the pattern matching determining unit determines whether the image matches the interpolation pattern at the edge of the image while assuming the portion outside the image as a background group and the data selecting unit appropriately changes the position of a pixel used in the interpolation, thereby interpolates pixels at the edge of the image.

For example, at the left edge of the image, an upper left interpolation target pixel obtained at the time of doubling the target pixel is interpolated with pixel data of a pixel on the upper side. In addition, at the upper edge of the image, an upper left interpolation target pixel obtained at the time of doubling the target pixel is interpolated with pixel data of a pixel on the left side.

In addition, the image processing device according to the embodiment of the present invention interpolates, when increasing the number of the target pixel constituting an on-screen image, at least one of pixels with data of an adjacent pixel instead of data of the original target pixel, thereby generating an on-screen image whose curved line is smoothly enlarged without reducing the resolution. That is, the data selecting unit adaptively switches the position of a pixel referred to for the interpolation of the pixel data according to the arrangement of background colors adjacent to the target pixel.

More specifically, the data selecting unit selects a pixel located on the upper side of the target pixel as the pixel to be referred to when two kinds of background colors are arranged adjacent to the target pixel in the horizontal direction. In addition, the data selecting unit selects a pixel located on the left side of the target pixel as the pixel to be referred to when two kinds of background colors are arranged adjacent to the target pixel in the vertical direction.

Additionally, a computer program according to a second aspect of the present invention is written in a computer-readable format and causes a computer to execute an image processing method for enlarging an image. The method includes an attribute determining step of determining an attribute of each pixel constituting an input image, a pattern matching determining step of determining whether a pattern of the input image, constituted by a target pixel and target-pixel-neighboring pixels that are determined to have the same attribute, matches a predetermined interpolation pattern while assuming each pixel of the input image as the target pixel, and a data selecting step of selecting pixel data for each of N×N pixels, obtained by enlarging the target pixel N-times, on the basis of the result of the matching determination obtained by performing the pattern matching determining step, where N is an integer equal to or greater than 2.

The computer program according to the second aspect of the present invention is written in a computer-readable format to realize predetermined processing on a computer. that is, the computer program according to the second aspect of the present invention is installed in the computer and cooperatively works on the computer, thereby offering advantages similar to those provided by the image processing device according to the first aspect of the present invention.

Embodiments of the present invention provide an image processing device and an image processing method capable of preferably performing on-screen display including icons and characters on a large screen, and a computer program for the same.

In addition, embodiments of the present invention provide an image processing device and an image processing method capable of enlarging artificial images, such as on-screen display areas, while maintaining the display quality, and a computer program for the same.

Additionally, embodiments of the present invention provide an image processing device and an image processing method capable of performing enlarging processing without causing a mismatch in a combined image of an artificial image, such as an on-screen display area, and another artificial image, and a computer program for the same.

Furthermore, embodiments of the present invention provide an image processing device and an image processing method capable of performing enlarging processing on enhanced character texts, such as outlines and shadowed characters, and on relatively complex artificial images, and a computer program for the same.

Embodiments of the present invention allow the size of circuit to be reduced since various kinds of interpolation processing according to images can be performed by employing categorization-free bilevel pattern matching even on a multilevel on-screen image without performing complex arithmetic processing.

In addition, embodiments of the present invention reduces or eliminates unnaturalness of background by adding background image processing even when an artificial image, such as character texts, is combined with a background image having a plurality of background colors, thereby increasing the quality of an enlarged image.

Image displaying processing according to embodiments of the present invention can be realized by adding management of a color palette under a control of a microcomputer, for example, and does not require additional flags. Thus, interpolation processing can be easily controlled just by executing generation of on-screen images in a manner that is the same as that employed in the related art.

Japanese Unexamined Patent Application Publication No. 2006-3420 has also suggested a method for enlarging images using pattern matching as described above. However, since an image processing device and an image processing method according to embodiments of the present invention adaptively switch the interpolation method according to the attribute of a target pixel, the image processing device and the image processing method can enlarge the target pattern into a high-quality image and can suppress generation of an unnatural pattern when a complex artificial image is combined with a background image.

Further features and advantages of the present invention will become apparent from the following detailed description of embodiments of the present invention and the attached drawings.

BRIEF DESCRIPTION OF THE DRAWINGS

FIG. 8A shows a result of performing interpolation and enlargement processing on an artificial image having a thick line attribute using an interpolation pattern for thick lines;

FIG. 8B shows a result of performing interpolation and enlargement processing on an artificial image having a thin line attribute using an interpolation pattern for thin lines;

FIG. 10 shows a result obtained by interpolating and enlarging an input image according to a condition that only an attribute group corresponding to the background is interpolated or is not interpolated;

DESCRIPTION OF THE PREFERRED EMBODIMENTS

Embodiments of the present invention will be described in detail below with reference to the accompanying drawings.

Figure 1:
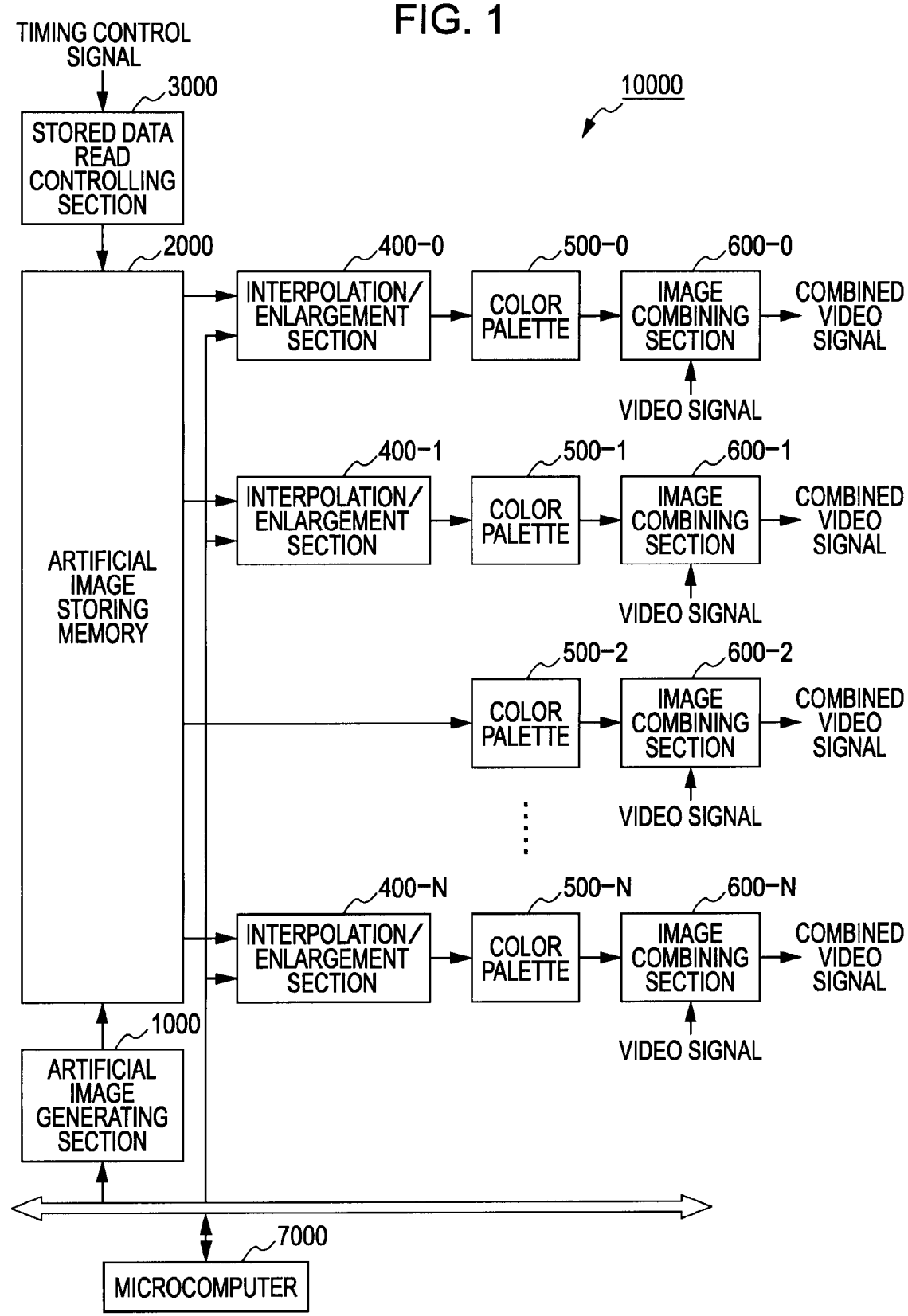
FIG. 1 shows an example of a configuration of an image processing device 10000 according to an embodiment of the present invention.

FIG. 1 shows an example of a configuration of an image processing device according to one embodiment of the present invention. An image processing device 10000 shown in the drawing includes an artificial image generating section 1000, an artificial image storing memory 2000 for storing generated artificial images, a stored data read controlling section 3000, interpolation/enlargement sections 400-0 to 400-N, color palettes 500-0 to 500-N, image combining sections 600-0 to 600-N. A microcomputer 7000 controls operations of the entire image processing device 10000 in an integrated fashion.

The artificial image generating section 1000 generates artificial images to be combined, such as on-screen images used for OSD. The on-screen images are images in a bit-map format represented by color codes, and includes graphics and fonts.

The generated artificial images, such as on-screen images, are temporarily stored in the artificial image storing memory 2000. The stored data read controlling section 3000 reads out the artificial images from the artificial image storing memory 2000 in synchronization with combination of the artificial image with a video signal, and outputs the read out images to a plurality of lines for combining images.

The lines for combining a video signal with an artificial image is constituted by a line for combining an artificial image with a video signal after interpolating and enlarging the artificial image by the interpolation/enlargement section 400-i (where, "i" is an integer between 0 and N other than 2) and a line for combining an artificial image with a video signal without enlarging the artificial image. In each line, each of the color palettes 500-0 to 500-N converts the interpolated and enlarged artificial image or the same size artificial image represented in color codes into RGB data or YCrCb data. The image combining sections 600-0 to 600-N combine the RGB data or the YCrCb data with the video signal. Through this steps, artificial images, such as on-screen images, can be commonly superimposed on video signals in the plurality of lines having different timings and different sizes.

Meanwhile, video signals supplied to each of the image combining sections 600-0 to 600-N are natural images that are captured with image pickup devices, such as, for example, digital cameras, and are recorded or transmitted. Since configurations of digital cameras and methods of processing captured images are not directly related to the spirit of the present invention, detailed description thereof is omitted herein.

Figure 2:
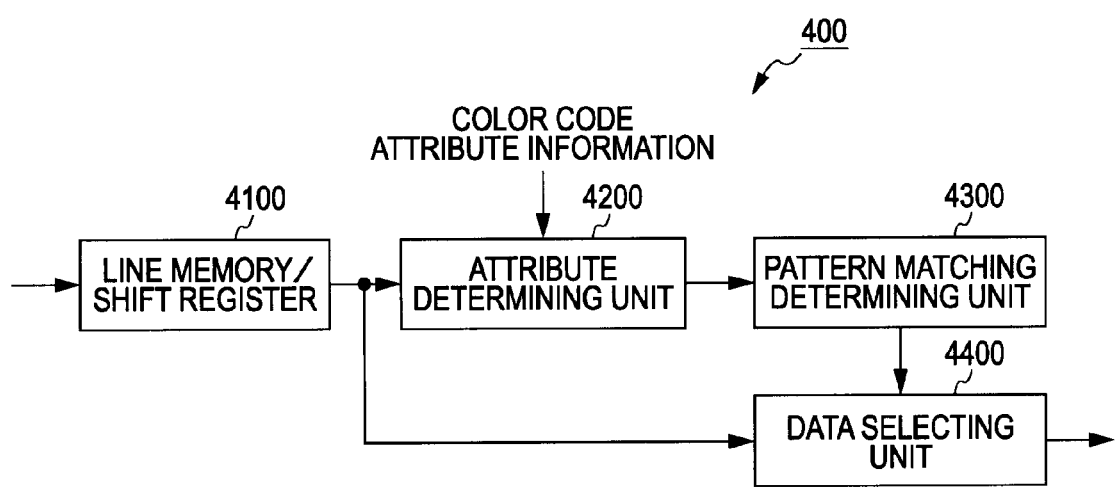
FIG. 2 shows an example of a configuration of interpolation/enlargement sections 400-0 to 400-N.

FIG. 2 shows an example of an internal configuration of each of the interpolation/enlargement sections 400-0 to 400-N. Each of the interpolation/enlargement sections 400-0 to 400-N shown in the drawing performs interpolation and enlargement processing of artificial images using pattern matching.

A line memory/shift register 4100 holds data of an interpolation target pixel and data of pixels neighboring the interpolation target pixel. The line memory/shift register 4100 supplies the data to an attribute determining unit 4200 and a data selecting unit 4400.

The attribute determining unit 4200 determines an attribute group that the color code of each of the interpolation target pixel and the neighboring pixels belongs to using any arbitrary methods. The attribute determining unit 4200 supplies a flag representing the result to a pattern matching determining unit 4300 at a subsequent stage. Herein, the attribute corresponds to an attribute of an artificial image of character information, such as, for example, a foreground group (for thick characters), a foreground group (for thin characters), a background group, and an outline group.

Figure 12:
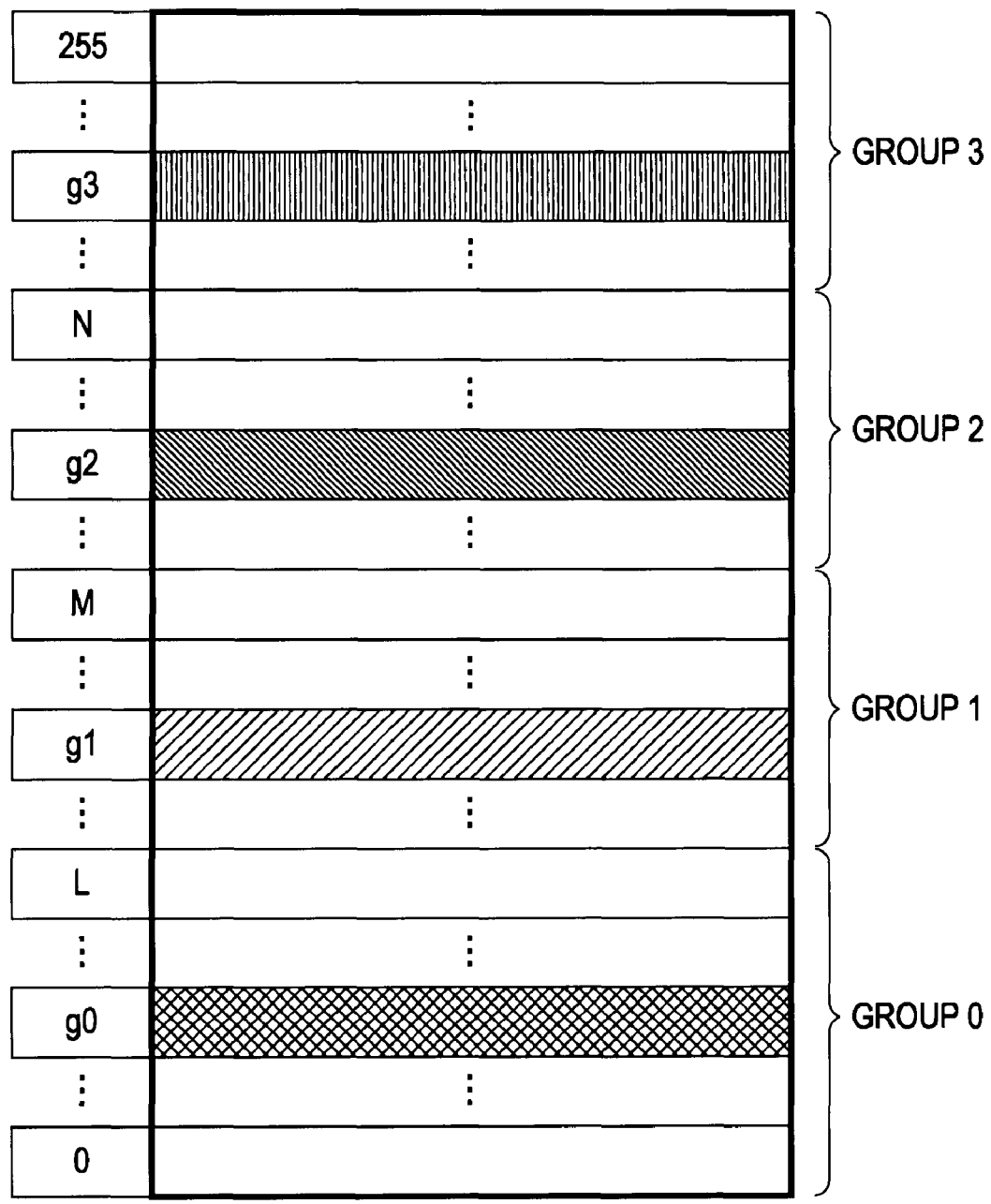
FIG. 12 shows a manner of grouping a color palette holding RGB or YCbCr data regarding an artificial image by ranges of addresses according to attribute groups of pixels.

Addressing color codes according to an attribute group of pixel data constituting an artificial image (i.e., categorizing color codes according to a range of address values) can be given as one method for determining the attribute group of a pixel. For example, as shown in FIG. 12, a condition is given to a color palette holding RGB data or YCbCr data of an artificial image in advance. More specifically, addresses 0 to L of the color palette are categorized into a group 0, while addresses L+1 to M, addresses M+1 to N, and addresses N+1 to 255 are categorized into a group 1, a group 2, and a group 3, respectively. This condition can be freely changed by the microcomputer 7000 or the like.

In the case of mapping color codes of an artificial image used for OSD to address groups different from those of natural images, such as background, an attribute of each target pixel (i.e., whether the target pixel belongs to an artificial image used as the foreground or a natural image used as the background) can be easily determined according to whether the color code is included in a predetermined address range group or not. More specifically, the attribute determining unit 4200 determines the attribute, such as a foreground group (for thick characters), a foreground group (for thin characters), a background group, and an outline group, on the basis of the categorization of color codes by the address range. This determination allows on-screen images to be easily generated using different attribute groups by just selecting the color code. In addition, by preparing the necessary number of attribute groups, flexibility can be increased.

Needless to say, the spirit of the present invention is not limited to a method for categorizing color codes for each attribute according to ranges of addresses. The attribute of each pixel can be determined using other methods, such as including an attribute flag as well as the color code in each pixel data constituting an artificial image.

The pattern matching determining unit 4300 treats each pixel, determined as the foreground by the attribute determining unit 4200, as a target pixel. The pattern matching determining unit 4300 compares a pattern of attribute determination results (i.e., results of determining whether the pixel belongs to the foreground or the background) of the target pixel and pixels neighboring the target pixel with one or more prepared interpolation patterns.

The data selecting unit 4400 then selects whether or not to interpolate at least one of increased N×N pixels with data of a neighboring pixel when the target pixel is enlarged N-times (where, N is an integer not smaller 2) on the basis of the result of matching determination performed by the pattern matching determining unit 4300.

According to the embodiment, the attribute determining unit 4200 can determine the attribute of whether the target pixel belongs to the foreground or the background on the basis of the value of the color code by including a plurality of pieces of attribute determining information (see FIG. 12) in each color code. The data selecting unit 4400 selects an interpolation pattern to be used in enlargement using pattern matching of the attribute-determined image, and performs enlarging processing of artificial images.

Furthermore, processing performed when a range of pattern matching performed by the pattern matching determining unit 4300 runs off the edge of an image may be defined. Additionally, the interpolation patterns may be categorized into groups for each attribute of the target pixel. More specifically, different interpolation patterns are prepared for each attribute group, such as a foreground thin character group, a foreground thick character group, and a foreground outline group, instead of simply using foreground interpolation patterns. In such a case, the pattern matching determining unit 4300 selects interpolation patterns to be used in pattern matching according the result of the attribute determination of the target pixel performed by the attribute determining unit 4200, and determines whether or not the patterns match. Even if the attribute determination results of the target pixel and neighboring pixels thereof are the same patterns, a method of selecting an interpolating pixel at the time of enlargement of the target pixel changes depending on types of the attribute groups. Thus, the enlargement processing is performed while adoptively switching the interpolation method according to the attribute group.

Particularly in enlargement processing of an artificial image targeting at a character, the image processing device according to the embodiment can select an optimum enlargement processing method (or an optimum pixel interpolation method used in the enlargement of a pixel) according to the attribute of the target pixel by determining the attribute on the basis of the color code value. The processing method may be processing for thick lines, processing for thin lines, processing for outlines, or processing for the background. Needless to say, in enlargement processing of an on-screen image of a complex artificial image including not only characters, the image processing device according to the embodiment can improve the quality of a background image and the quality of outlined characters as well as the quality of characters with a small memory capacity.

Japanese Unexamined Patent Application Publication No. 2006-3420 has also suggested a method for enlarging images using pattern matching as described above. However, since the image processing device and the image processing method according to the embodiment of the present invention adaptively switch the interpolation method according to the attribute of the target pixel, the image processing device and the image processing method can enlarge the target pattern into a high-quality image and can suppress generation of an unnatural pattern when a complex artificial image is combined with a background image.

Now, processing for doubling an image in the vertical and horizontal directions according to a result of pattern matching performed by the pattern matching determining unit 4300 will be described with reference to FIGS. 3A to 3D.

The pattern matching determining unit 4300 prepares the necessary number of interpolation patterns used for interpolating a target pixel at the time of enlargement processing of an image. If a foreground or background pattern constituted by the target pixel and neighboring pixels thereof matches one of the interpolation patterns as a result of the pattern matching determination processing, interpolated and enlarged pixels that appear to be smooth even after the enlargement of the image are generated by replacing one of pixels obtained by doubling the target pixel in the horizontal and vertical directions with data of a neighboring pixel instead of data of the target pixel.

Figure 3A:
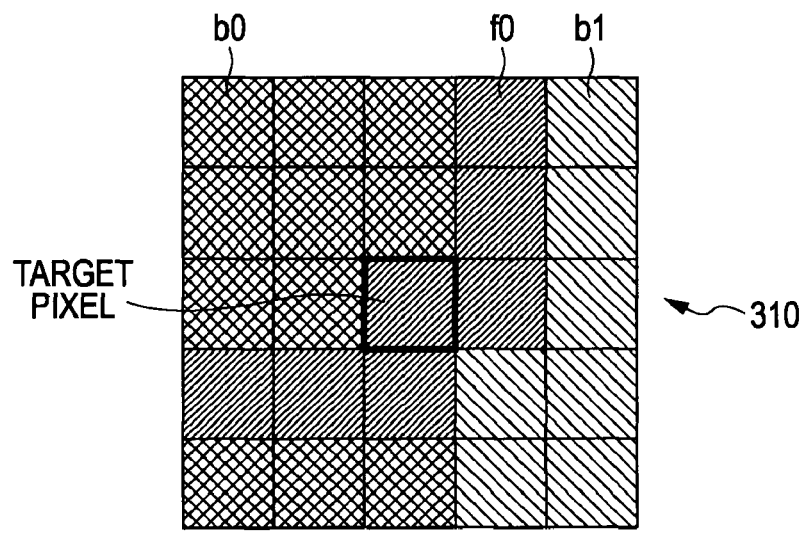
FIG. 3A shows an example of an on-screen display image 310 supplied to an attribute determining unit 4200.

FIG. 3A shows an example of a result determined by the attribute determining unit 4200, namely, an input example 310 supplied to the pattern matching determining unit 4300. A color code, which is categorized according to the attribute of the pixel, is assigned to each pixel. Referring to FIG. 3A, attribute values b0 and b1 represent color codes belong to a background group, while an attribute value f0 represents a foreground group. A pixel with a thick frame in a foreground pattern having the attribute value f0 corresponds to the target pixel.

Figure 3B:
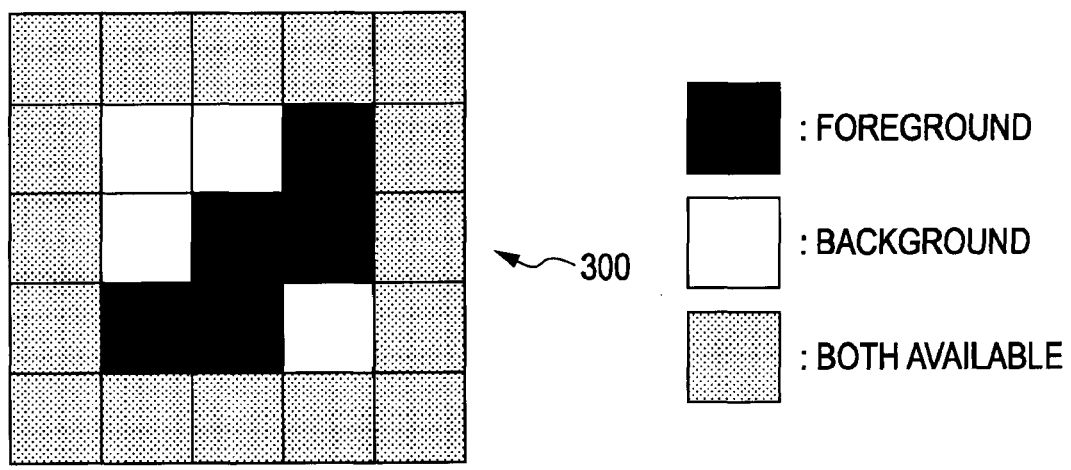
FIG. 3B shows an example of an interpolation pattern 300 prepared for interpolation of a target pixel.

FIG. 3B shows an example of an interpolation pattern 300 prepared for determining whether or not to interpolate a target pixel. The interpolation pattern shown in the drawing includes a black area corresponding to the foreground pattern, a white area corresponding to the background pattern, and an area for which whether the attribute of the pixel belong to the background or the foreground does not matter.

Figure 3C:
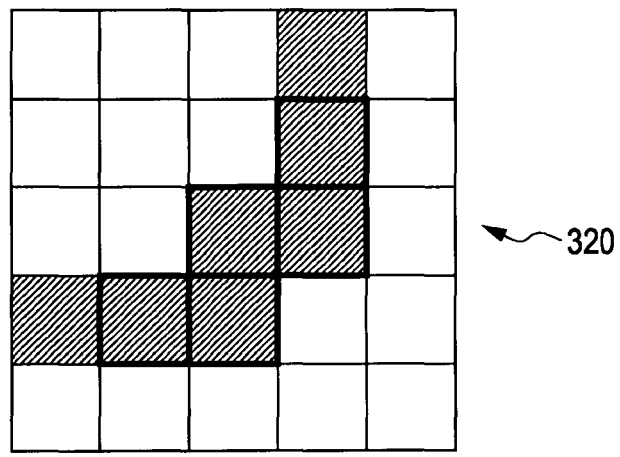
FIG. 3C shows a foreground pattern included in image information output from an attribute determining unit 4200 when an on-screen display image shown in FIG. 3A is input.

The pattern matching determining unit 4300 compares the interpolation pattern shown in FIG. 3B with the foreground pattern of the attribute determined image shown in FIG. 3A to perform the pattern matching. FIG. 3C shows a foreground pattern included in the image information output form the attribute determining unit 4200 when the on-screen display image shown in FIG. 3A is input to the attribute determining unit 4200.

Even if two or more kinds of color codes belonging to the background group exist in the pattern, the color codes are equally treated as the background as shown in FIG. 3C. In addition, the interpolation pattern shown in FIG. 3B includes an area for which whether the attribute of the pixel belongs to the background or the foreground does not matter. Accordingly, when the pattern matching is performed on the images shown in FIGS. 3A and 3B, pixels, including the target pixel, enclosed by a thick frame in a processing-target image area 320 are determined to match the interpolation pattern (the same applies to a case where a plurality of color codes belonging to the foreground group exist in an image output by the attribute determining unit 4200) as shown in FIG. 3C.

Figure 3D:
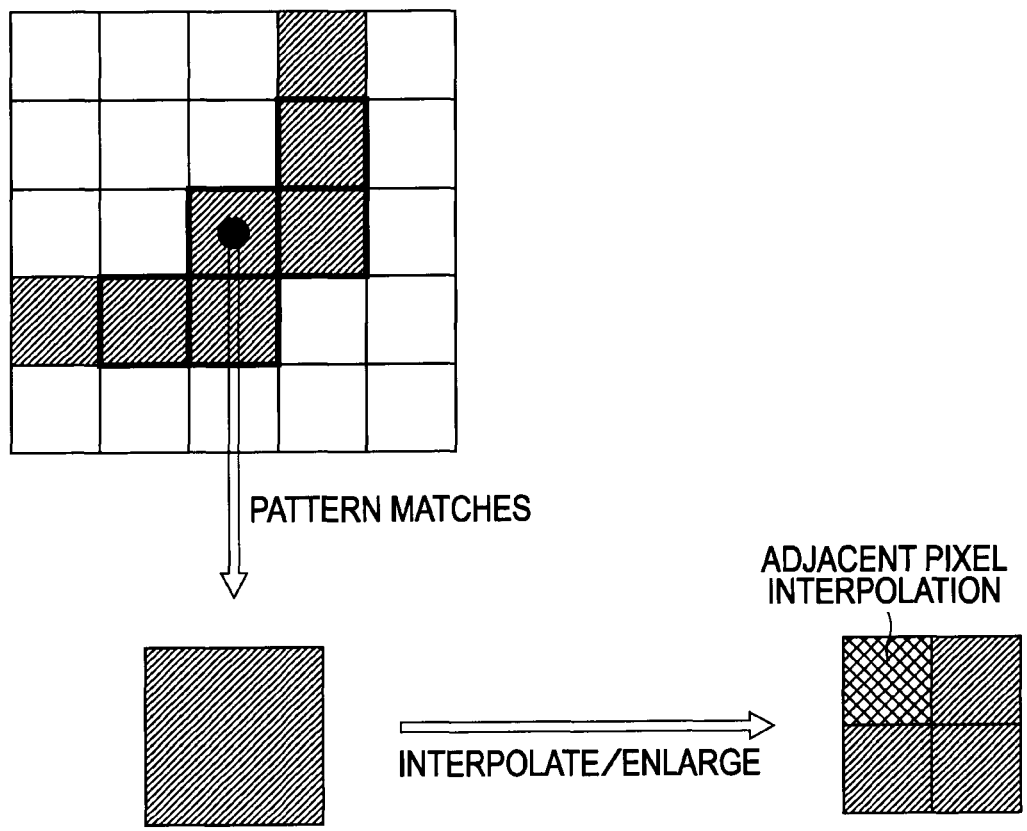
FIG. 3D shows a manner of interpolating an upper left pixel, in a 2×2 pixel matrix obtained by doubling a target pixel in the horizontal and vertical directions, with pixel data of an adjacent pixel instead of that of the original target pixel, and using pixel data of the original target pixel for three other pixels.

When the foreground pattern of the target pixel and the neighboring pixels matches any one of interpolation patterns prepared by the pattern matching determining unit 4300, interpolation methods used for interpolating the target pixel twice in the horizontal and vertical directions are adaptively switched according to the matched pattern. More specifically, when the foreground pattern matches the interpolation pattern shown in FIG. 3C, a pixel data interpolated with the neighboring pixel instead of the original target pixel is used for a upper left pixel in the 2×2 pixels obtained by doubling the target pixel in the vertical and horizontal direction as shown in FIG. 3D. Pixel data of the original target pixel is used for the three other pixels.

Meanwhile, when the target pixel is doubled in the horizontal and vertical directions, an upper left pixel of four pixels in a 2×2 matrix is set as a pixel to be interpolated with the neighboring pixel. By performing this operation while rotating the pixel matrix by 90 degrees, all of the four pixels can be treated as the target of the interpolation.

Figure 3E:
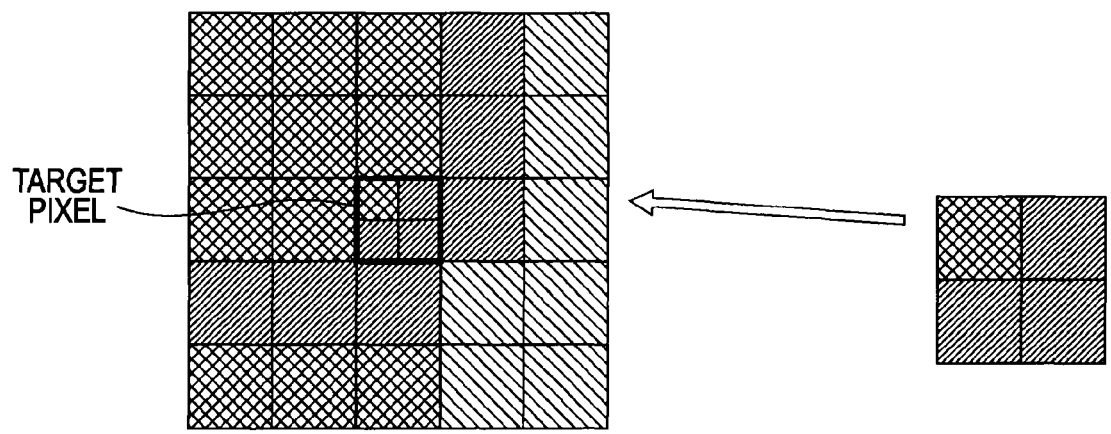
FIG. 3E shows a result obtained by applying an interpolation method shown in FIG. 3D at the time of enlarging an image (see FIG. 3A) supplied to a pattern matching determining unit 4300.

FIG. 3E shows a result obtained by applying the interpolation method shown in FIG. 3D at the time of enlarging the image (see FIG. 3A) supplied to the pattern matching determining unit 4300. It can be understood that the image is interpolated and enlarged so that the edge of the foreground pattern appears to be smooth from FIG. 3E.

Figure 4A:
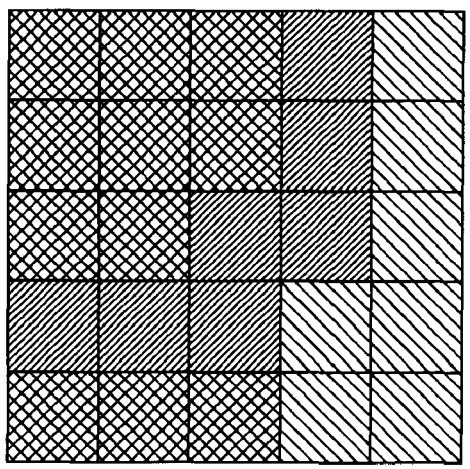
FIG. 4A shows a processing example in which interpolation and enlargement are applied to a whole image.
Figure 4B:
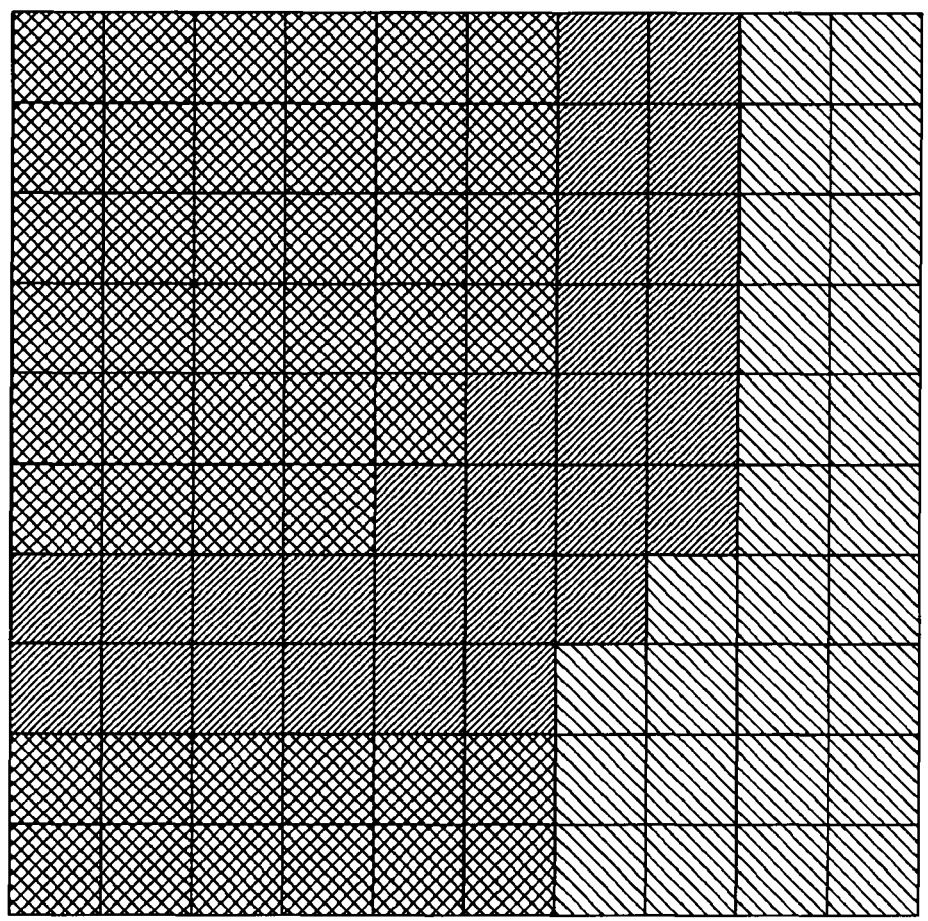
FIG. 4B shows a processing example in which interpolation and enlargement are applied to a whole image.

FIGS. 4A and 4B show results obtained by applying the pixel interpolation and enlargement processing as shown in FIGS. 3A to 3E while assuming all of pixels of an input image as a target pixel. An input image shown in FIG. 4A includes a foreground pattern, such as an on-line screen image. When the number of pixels of this whole input image is doubled in the vertical and horizontal directions, at least one of pixels in the enlarged 2×2 pixels corresponding to a bent portion of the foreground pattern is interpolated by pixel data of the neighboring pixel instead of the pixel data of the original target pixel. As a result, a foreground pattern (an on-screen image) whose curved line is smoothly enlarged can be generated without reducing the resolution even if the number of the pixels is doubled in the vertical and horizontal directions as shown in FIG. 4B.

Figure 5A:
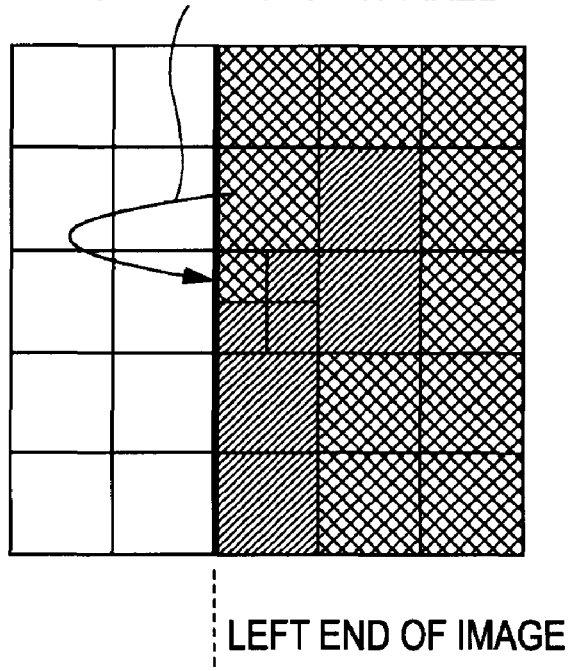
FIG. 5A shows a manner of interpolating an upper left interpolation target pixel of a doubled target pixel with data of an upper pixel at the left edge of an image.
Figure 5B:
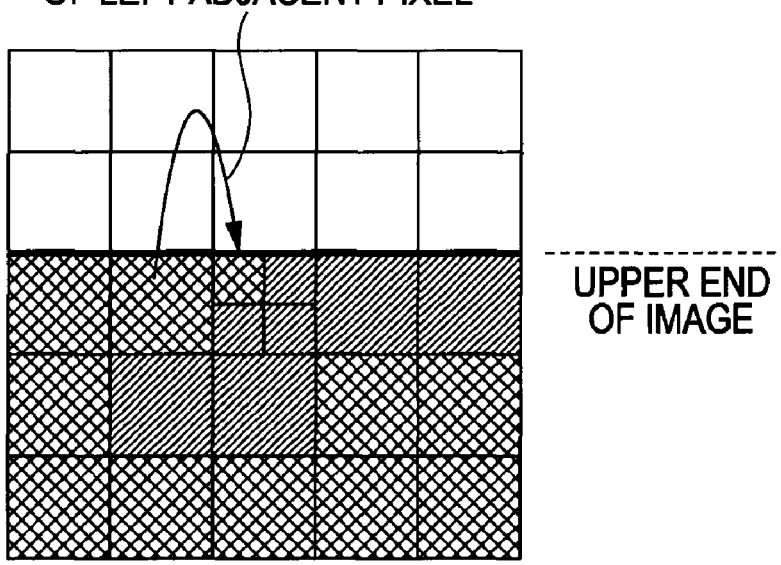
FIG. 5B shows a manner of interpolating an upper left interpolation target pixel of a doubled target pixel with data of a left pixel at the upper edge of an image.

In this embodiment, processing performed when a range for which the pattern matching determining unit 4300 determines whether or not patterns match runs off the edge of an image is defined. FIGS. 5A and 5B show a manner of performing pattern matching determination at edges of an image. The pattern matching determining unit 4300 determines matching of a foreground pattern and an interpolation pattern at the edge of the image while assuming that a region outside the image belongs to the background group. Additionally, the data selecting unit 4400 appropriately changes the position of a pixel to be used in interpolation. In this manner, it is possible to interpolate pixels located at the edge. For example, at the left edge of the image, an upper left interpolation target pixel of the doubled target pixel is interpolated with data of an upper pixel as shown in FIG. 5A. Additionally, at the upper edge of the image, an upper left interpolation target pixel of the doubled target pixel is interpolated with data of a left pixel as shown in FIG. 5B.

As described above, according to the embodiment, when the number of the target pixel constituting an on-screen image is increased, at least one of the increased pixels is interpolated with data of a neighboring pixel instead of data of the original target pixel, thereby generating an on-screen image whose curved line is smoothly enlarged without reducing the resolution. The position of a pixel referred to as an interpolation data is adaptively switched according to arrangement of background colors adjacent to the target pixel.

Figures 6A, 6B:
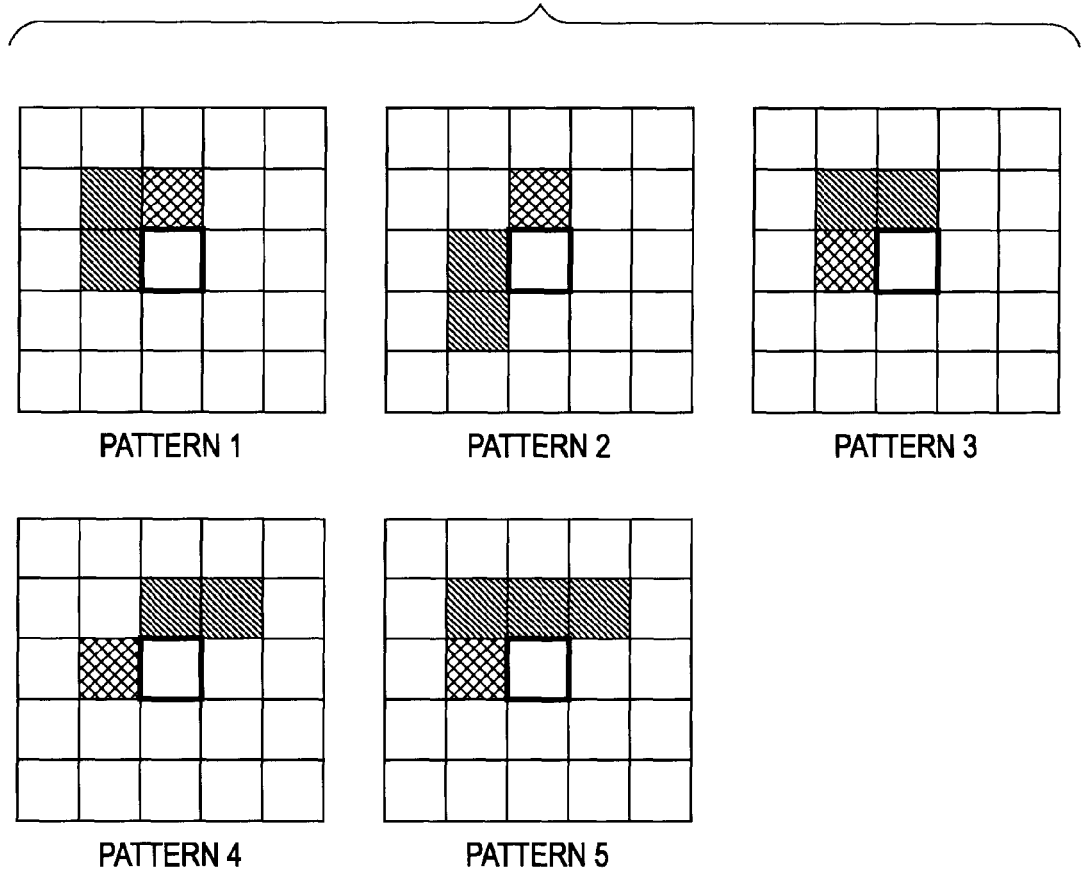
FIG. 6A shows the position of each pixel in a pixel block constituted by 5×5 pixels.
FIG. 6B shows examples of arrangement of background colors of pixels adjacent to a target pixel M0C0.

When a target pixel is doubled in the vertical and horizontal directions, the position of a pixel to be interpolated with an adjacent pixel is an upper left one of four pixels in a 2×2 matrix. The position of a pixel referred to for interpolation of pixel data is adaptively switched according to arrangement of background colors. For example, the position of each pixel in a pixel block constituted by 5×5 pixels is shown in FIG. 6A. Among these pixels, a pixel M0C0 is treated as a target pixel. When pixels adjacent to this target pixel M0C0 have each background color pattern shown in FIG. 6B, the position of a pixel to be referred to for interpolation of pixel data can be defined as follows. According to types of the pattern, one of these definitions is reflected.

Pattern 1: MOL1==U1L1→Pixel data of a pixel located on the upper side of the target pixel is referred to.

Pattern 2: MOL1==D1L1→Pixel data of a pixel located on the upper side of the target pixel is referred to.

Pattern 3: U1L1==U1C0→Pixel data of a pixel located on the left side of the target pixel is referred to.

Pattern 4: U1C0==U1R1→Pixel data of a pixel located on the left side of the target pixel is referred to.

Pattern 5: U1C0==U1L1==U1R1→Pixel data of a pixel located on the left side of the target pixel is referred to.

Figure 6C:
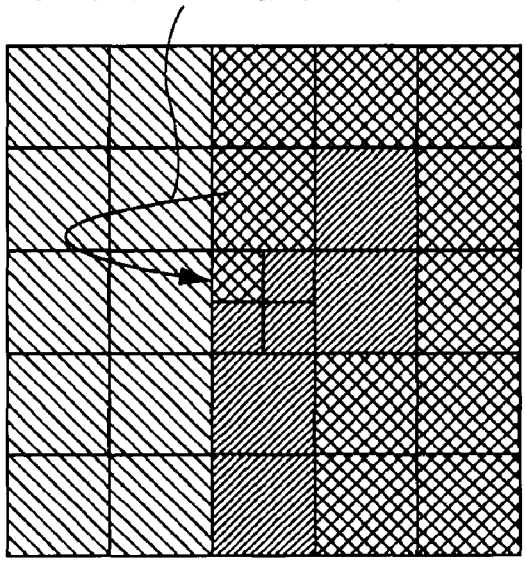
FIG. 6C shows a manner of interpolating an upper left pixel of 2×2 pixels, obtained by enlarging a target pixel twice, with reference to pixel data of a pixel on the upper side of the target pixel when two kinds of background colors are arranged adjacent to the target pixel in the horizontal direction.

For example, in a case where two kinds of background colors are arranged adjacent to a target pixel in the horizontal direction as shown in FIG. 6C, an upper left pixel of 2×2 pixels obtained by doubling the target pixel can be interpolated with reference to pixel data of a pixel located on the upper side of the target pixel.

Figure 6D:
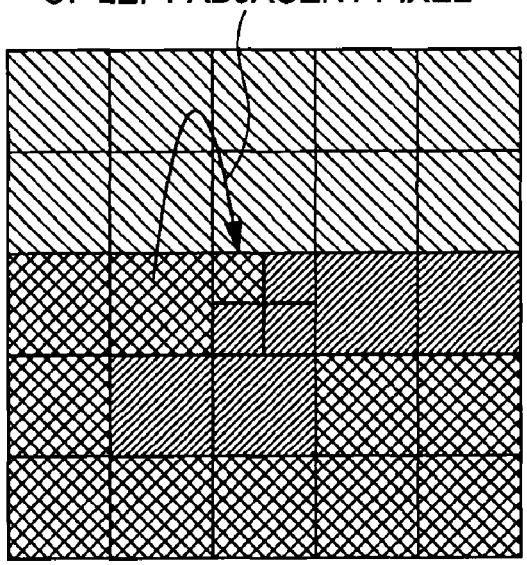
FIG. 6D shows a manner of interpolating an upper left pixel of 2×2 pixels, obtained by enlarging a target pixel twice, with reference to pixel data of a pixel on the left side of a target pixel when two kinds of background colors are arranged adjacent to the target pixel in the vertical direction.

In addition, as shown in FIG. 6D, when two kinds of background color are arranged adjacent to a target pixel in vertical direction, an upper left pixel of a 2×2 pixels obtained by doubling the target pixel can be interpolated with reference to pixel data of a pixel located on the left side of the target pixel.

As described above, a plurality of attribute groups, such as a foreground thin character group, a foreground thick character group, and a foreground outline group, are provided and interpolation patterns may be categorized for each attribute group instead of simply using one kind of attribute, such as a foreground interpolation pattern.

More specifically, the pattern matching determining unit 4300 selects interpolation patterns used in pattern matching according to a determination result of the attribute of the target pixel performed by the attribute determining unit 4200, and performs pattern matching. In such a case, even if the attribute determination results of the target pixel and neighboring pixels thereof are the same patterns, a method of selecting an interpolation pixel at the time of enlargement of the target pixel changes depending on types of the attribute groups. Thus, the enlargement processing is performed while adaptively switching the interpolation method according to the attribute group.

In the following, processing performed by the pattern matching determining unit 4300 using different interpolation patterns for each attribute group to determine matching of patterns will be described with reference to FIGS. 7A to 7H.

Figure 7A:
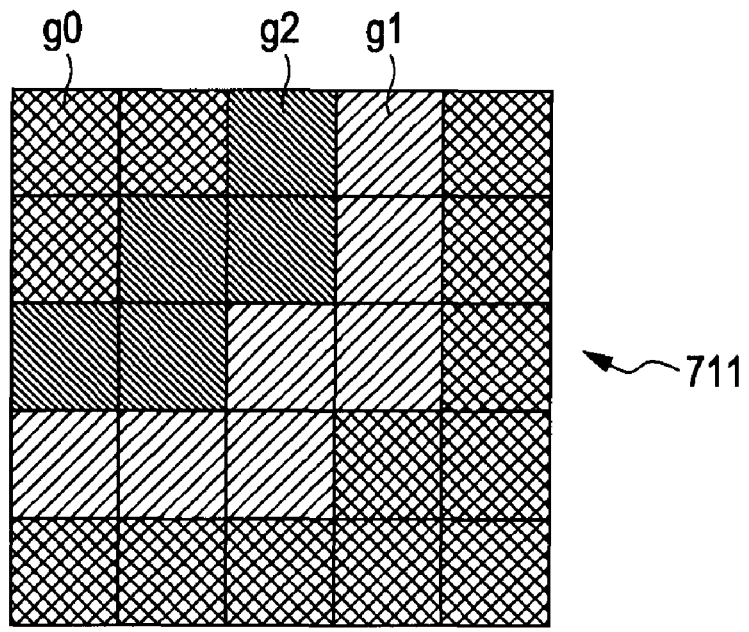
FIG. 7A shows an input example 711 supplied to a pattern matching determining unit 4300.
Figure 7B:
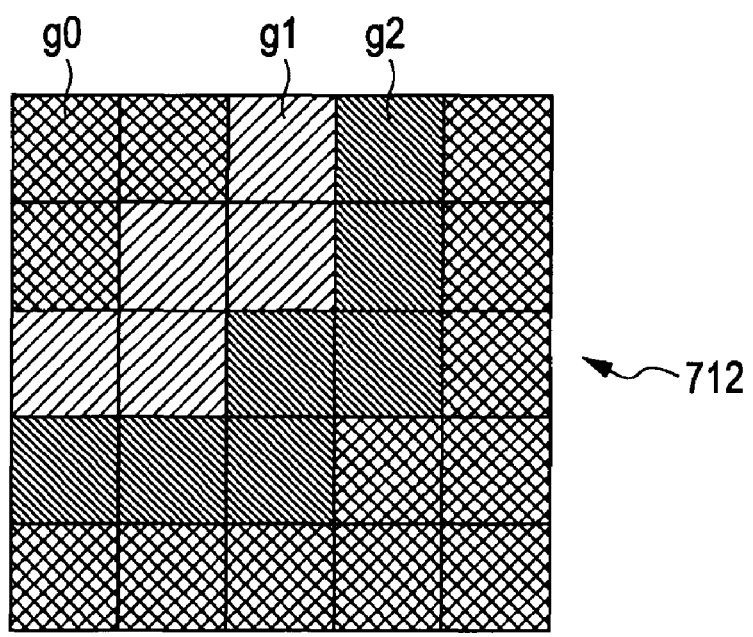
FIG. 7B shows an input example 712 supplied to a pattern matching determining unit 4300.

FIGS. 7A and 7B show examples of determination results in the attribute determining unit 4200, namely, examples of inputs 711 and 712 supplied to the pattern matching determining unit 4300, respectively. Referring to FIGS. 7A and 7B, g1 and g2 represents pixels having colors (color codes) belonging to attribute groups 1 and 2, which are targets of the pattern matching determination, respectively. In addition, g0 represent a pixel having a color (color code), which are target of the pattern matching determination.

Figure 7C:
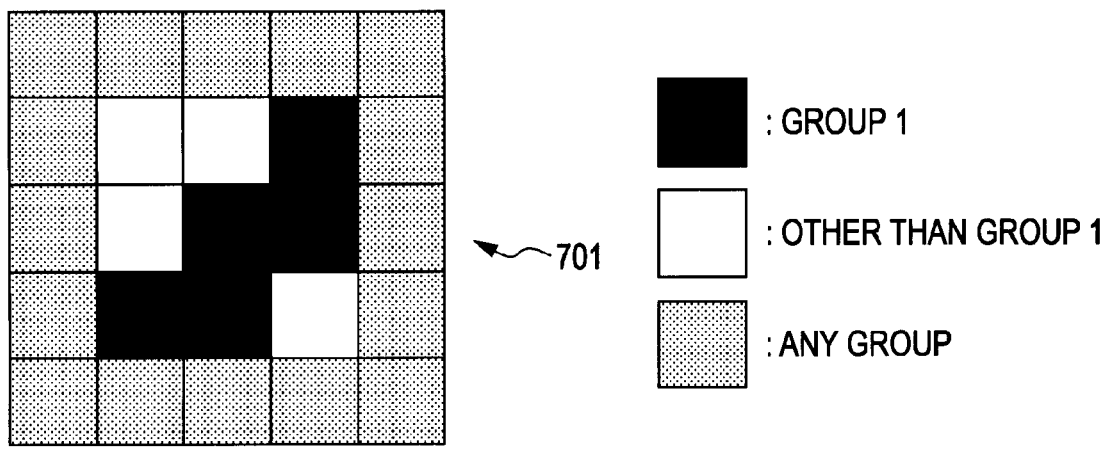
FIG. 7C shows an interpolation pattern 701 prepared for an attribute group 1 and used for determining whether to interpolate a target pixel.
Figure 7D:
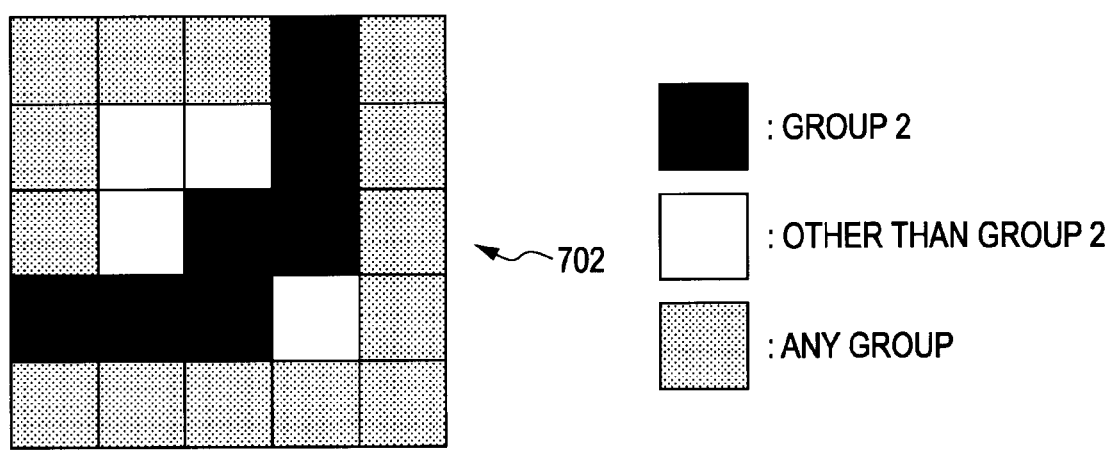
FIG. 7D shows an interpolation pattern 702 prepared for an attribute group 2 and used for determining whether to interpolate a target pixel.

FIGS. 7C and 7D show interpolation patterns 701 and 702 prepared for the attribute groups 1 and 2 and used in determining whether or not to interpolate the target pixel, respectively. The interpolation patterns shown in the drawings include a black area corresponding to the foreground pattern, a white area corresponding to the background pattern, and a dotted area for which whether the attribute of the pixel belongs to the background or the foreground does not matter.

The pattern matching determining unit 4300 selects interpolation patterns to be used in the pattern matching according to the attribute group to which the attribute of the target pixel determined by the attribute determining unit 4200 belongs, and determines whether or not the patterns match.

For example, when being supplied with an image 711 shown in FIG. 7A from the attribute determining unit 4200, the pattern matching determining unit 4300 performs pattern matching determining processing using an interpolation pattern 701 shown in FIG. 7C since the target pixel has a color code g1 belonging to the attribute group 1.

Figure 7E:
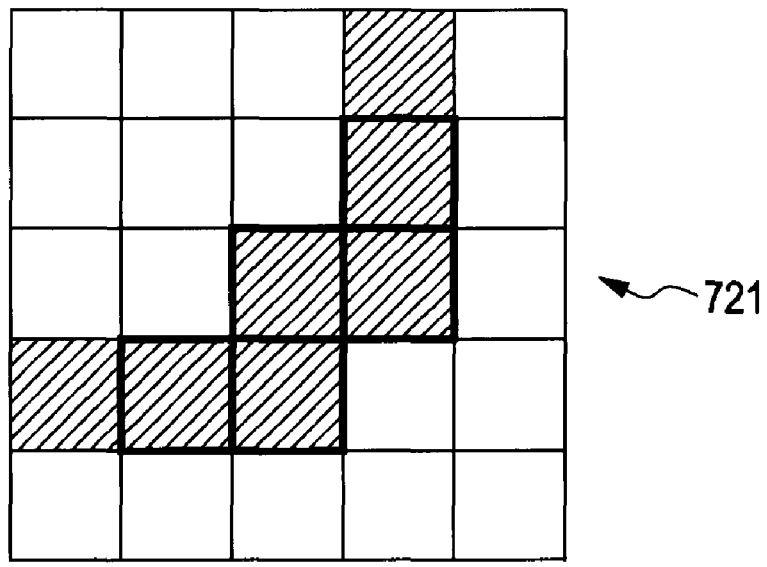
FIG. 7E shows a result 721 of pattern matching of an input image 711 shown in FIG. 7A and an interpolation pattern 701 shown in FIG. 7C.

FIG. 7E shows a result 721 of performing the pattern matching using the input image 711 shown in FIG. 7A and the interpolation pattern 701 shown in FIG. 7C. Even if two kinds of color code belonging to the background group exist in the pattern, the color codes are equally treated as the background. Accordingly, when the pattern matching is performed on the images shown in FIGS. 7A and 7C, pixels, including the target pixel, enclosed by a thick frame in a processing-target image area 711 are determined to match the interpolation pattern (the same applies to a case where a plurality of attribute values belonging to the same group exist in the image 711 output by the attribute determining unit 4200) as shown in FIG. 7E.

Figure 7F:
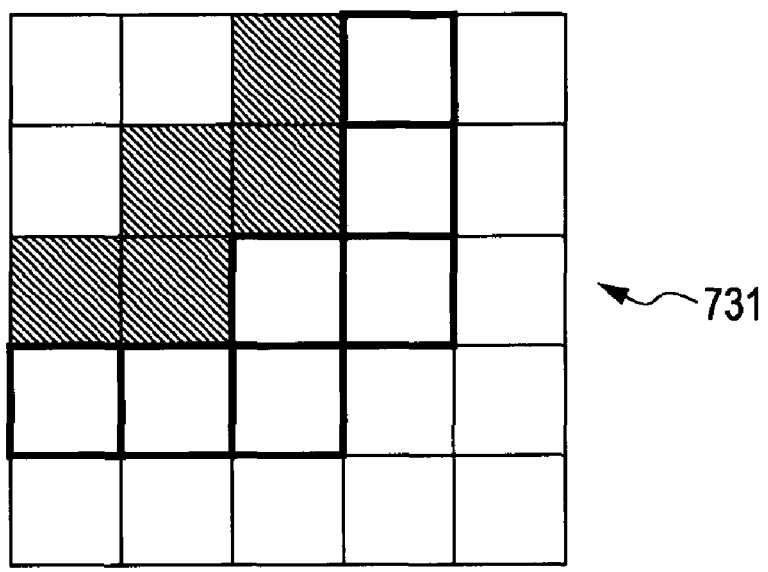
FIG. 7F shows a result 731 of pattern matching of an input image 711 shown in FIG. 7A and an interpolation pattern 702 shown in FIG. 7D.

Additionally, FIG. 7F shows a result 731 of performing the pattern matching of the input image 711 shown in FIG. 7A and the interpolation pattern 702 shown in FIG. 7D. In this case, since the pattern matching is performed using the interpolation pattern 702 for the attribute group 2 to which the color code g1 of the target pixel does not belong, it may be determined that the image 711 does not match the interpolation pattern.

On the other hand, when being supplied with the image 712 shown in FIG. 7B from the attribute determining unit 4200, the pattern matching determining unit 4300 performs pattern matching determining processing using the interpolation pattern 702 shown in FIG. 7D since the target pixel has the color code g2 belonging to the attribute group 2.

Figure 7G:
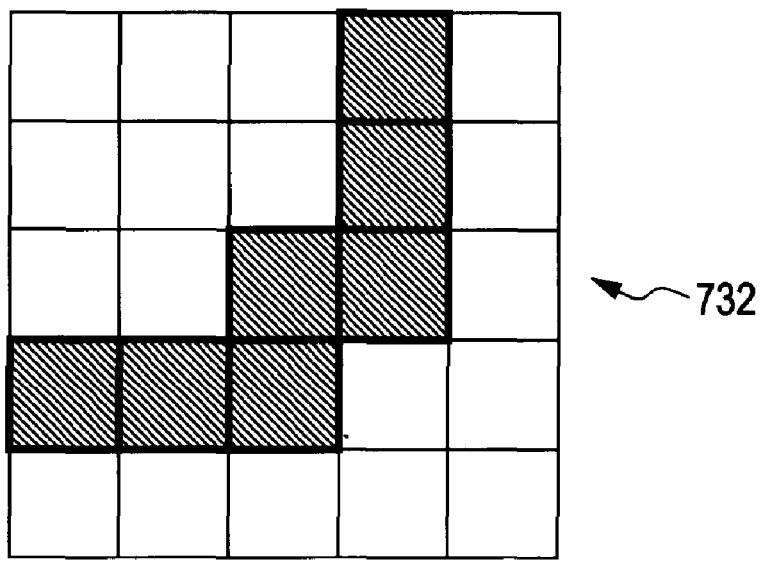
FIG. 7G shows a result 732 of pattern matching of an input image 712 shown in FIG. 7B and an interpolation pattern 702 shown in FIG. 7D.

FIG. 7G shows a result 732 of performing the pattern matching of the input image 712 shown in FIG. 7B and the interpolation pattern 702 shown in FIG. 7D. Even if two or more kinds of color code belonging to the background group exist in the pattern, the color codes are equally treated as the background. Accordingly, when the pattern matching is performed on the images shown in FIGS. 7B and 7D, pixels, including the target pixel, enclosed by a thick frame in a processing-target image area 712 are determined to match the interpolation pattern (the same applies to a case where a plurality of attribute values belonging to the same group exist in the image 712 output by the attribute determining unit 4200) as shown in FIG. 7G.

Figure 7H:
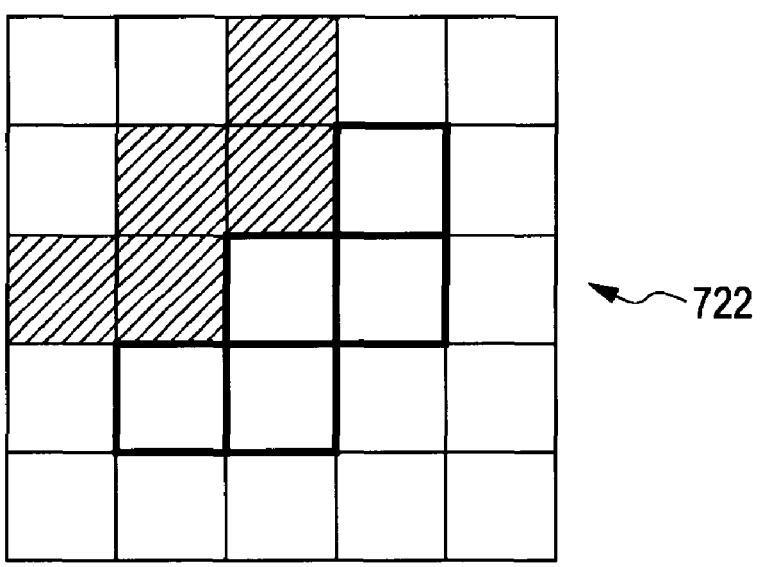
FIG. 7H shows a result 722 of pattern matching of an input image 712 shown in FIG. 7B and an interpolation pattern 701 shown in FIG. 7C.

In addition, FIG. 7H shows a result 722 of performing pattern matching of the input image 712 shown in FIG. 7B and the interpolation pattern 701 shown in FIG. 7C. In this case, since the pattern matching is performed using the interpolation pattern 701 for the attribute group 1 to which the color code g2 of the target pixel does not belong, it may be determined that the image 712 does not match the interpolation pattern.

Additionally, grouping of attributes of pixels is not limited to colors (color codes). For example, characters used as artificial images, thick lines, and thin lines are treated as attribute groups. Interpolation patterns according to the attribute groups are prepared and the enlargement processing can be performed while adaptively switching the interpolation method according to the attribute groups.

FIG. 8A shows a result of performing interpolation and enlargement processing on an artificial image having the thick line attribute using an interpolation pattern for thick lines. In addition, FIG. 8B shows a result of performing interpolation and enlargement processing of an artificial image having the thin line attribute using an interpolation pattern for thin lines. As is clear form comparison of FIGS. 8A and 8B, characteristics of thick lines and thin lines can be maintained after the interpolation and enlargement by performing the enlargement processing while adaptively switching the interpolation method according to the attribute group of the target pixel.

The procedure for providing a plurality of attribute groups regarding attributes of pixels, categorizing interpolation patterns for each attribute group, and appropriately switching interpolation patterns to be used at the time of interpolation and enlargement according to the type of the attribute group of the target pixel has already been described with reference to FIGS. 7A to 7H. During such processing operation, the pattern matching determining unit 4300 can further define priority relationships between attribute groups.

For example, suppose that a priority relationship that the attribute group 2 has priority over the attribute group 1 is defined. In such a case, when the target pixel belongs to the attribute group 2, the attribute group 1 is not treated as the other group. On the other hand, when the target pixel belongs to the attribute group 1, the attribute group 2 can be treated as the same group.

Figure 9A:
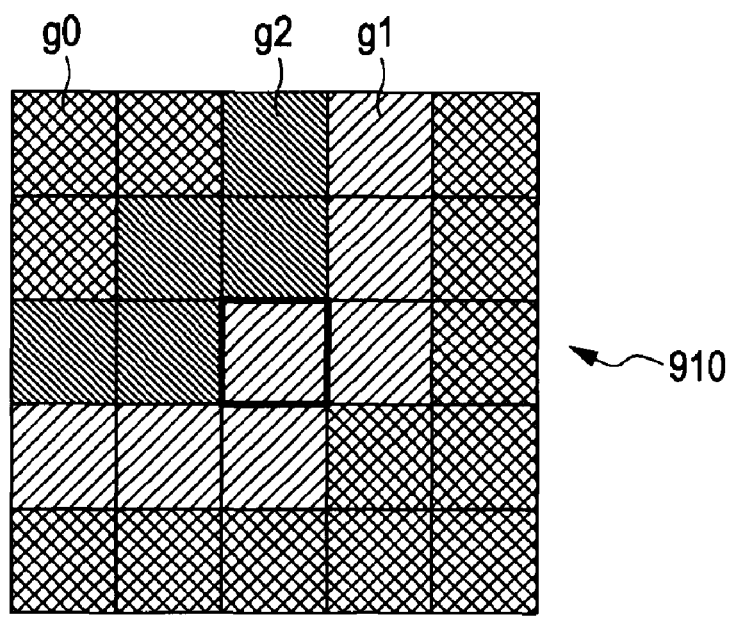
FIG. 9A shows an input image 910 supplied to a pattern matching determining unit 4300.

Now, a case where an image 910 shown in FIG. 9A is supplied to the pattern matching determining unit 4300 will be considered. In the input image 910 shown in the drawing, g1 and g2 are pixels having colors (color codes) belonging to attribute groups 1 and 2, which are targets of pattern matching determination, respectively. In addition, g0 is a pixel having a color (color code), which is a target of the pattern determination.

Figure 9B:
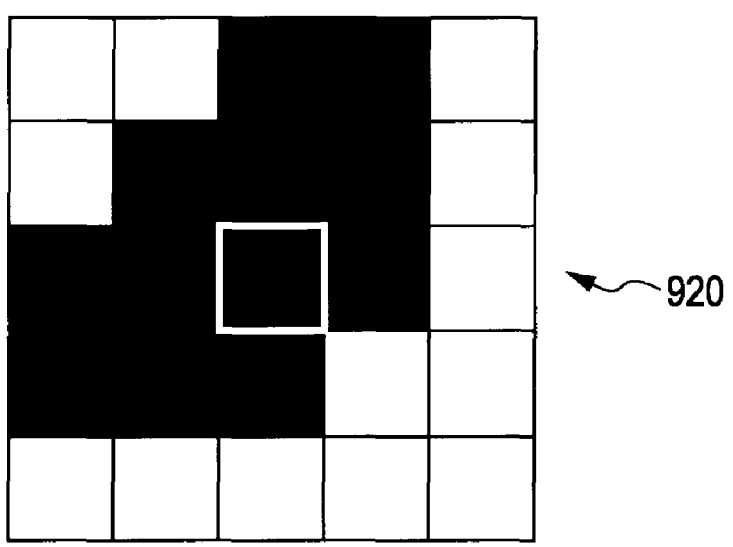
FIG. 9B shows an equivalent image 920 of an input image 910 shown in FIG. 9A used when an pattern matching determining unit 4300 performs pattern matching for an attribute 1 in a case where a priority relationship that an attribute group 2 has priority over an attribute group 1 is defined.
Figure 9C:
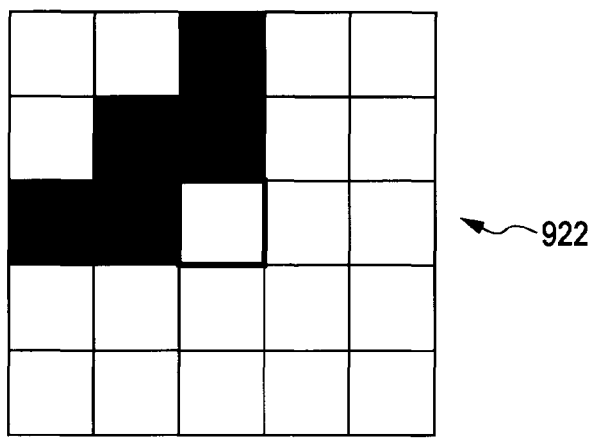
FIG. 9C shows an equivalent image 922 of an input image 910 shown in FIG. 9A used when a pattern matching determining unit 4300 performs pattern matching for an attribute pattern 2 in a case where a priority relationship that the attribute group 2 has priority over an attribute group 1 is defined.

In a case where a priority relationship that the attribute group 2 has priority over the attribute group 1 is defined, since pixels belonging to the attribute group 2 are treated as pixels belonging to the same group when the image is compared with an interpolation pattern for the attribute group 1, the pattern matching determining unit 4300 treats an input image 910 shown in FIG. 9A as an equivalent image 920 shown in FIG. 9B, and determines whether the input image 910 matches the interpolation pattern for the attribute group 1. On the other hand, since pixels belonging to the attribute group 1 are not treated as pixels belonging to the same group when the input image is compared with interpolation patterns for the attribute group 2, the pattern matching determining unit 4300 treats the input image 910 shown in FIG. 9A as an equivalent image 922 shown in FIG. 9C, and determines whether the input image 910 matches the interpolation patterns for the attribute group 2.

Figure 9D:
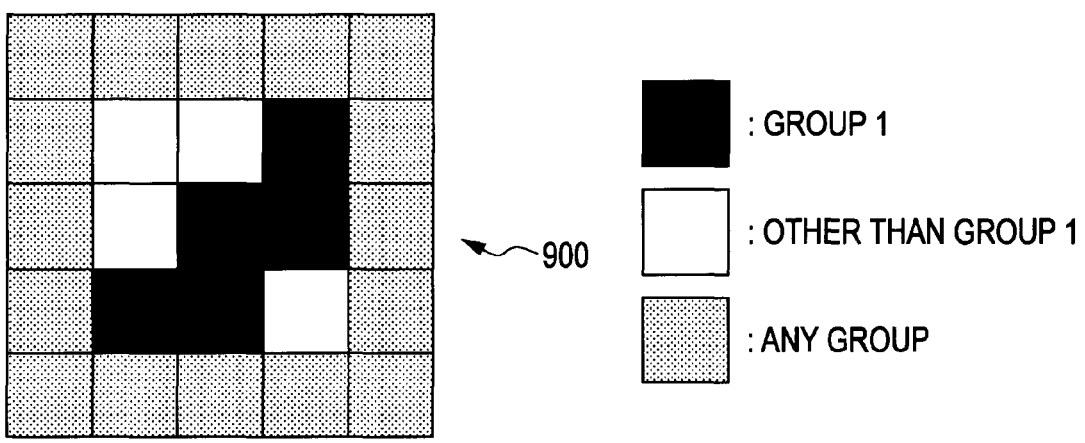
FIG. 9D shows an interpolation pattern 900 prepared for an attribute group 1 by a pattern matching determining unit 4300.
Figure 9E:
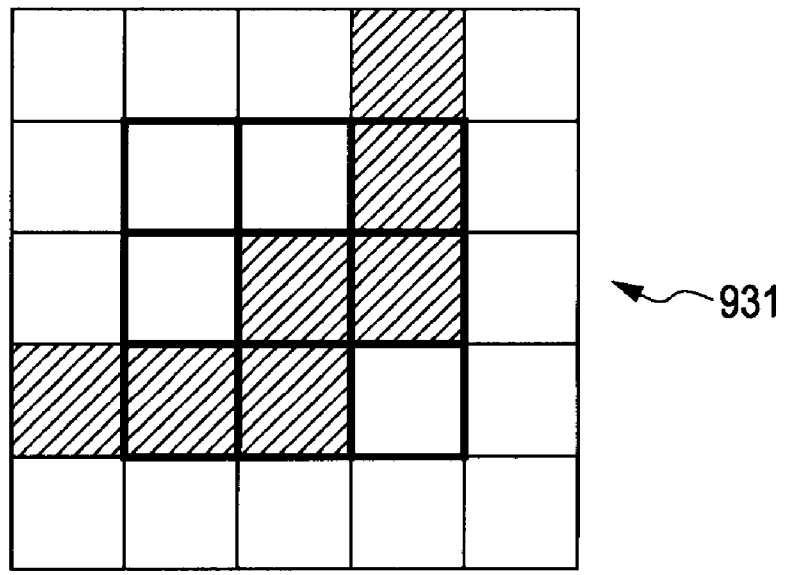
FIG. 9E shows a result 931 obtained when a pattern matching determining unit 4300 performs ordinal pattern matching without defining a priority relationship between an attribute groups 1 and 2.

Suppose that the pattern matching determining unit 4300 has prepared an interpolation pattern 900 shown in FIG. 9D for the attribute group 1. In a case where the priority relationship between the attribute groups 1 and 2 is not defined and ordinary pattern matching, i.e., pattern matching of the interpolation pattern 900 and the equivalent image 920 of the input image is performed, a pattern 931 is determined to match as shown in FIG. 9E, and is to be interpolated.

Figure 9F:
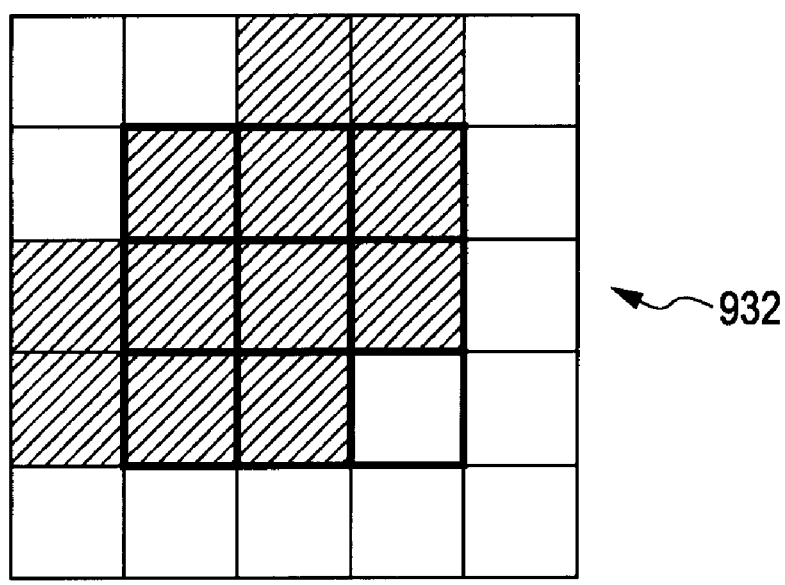
FIG. 9F shows a result 932 obtained when a pattern matching determining unit 4300 performs pattern matching after defining a priority relationship between attribute groups 1 and 2.

On the other hand, in a case where a priority relationship is defined between the attribute groups 2 and 1, since pattern matching putting the attribute group 2 ahead of the attribute group 1, i.e., pattern matching of the interpolation pattern 900 and the equivalent image 922 of the input image is performed, an pattern 932 is determined not to match as shown in FIG. 9F, and the interpolation is not performed thereon.

According to the example shown in FIGS. 9A to 9F, images to be determined to match each other in ordinary pattern matching are determined to mismatch by defining the priority relationship between the attribute groups and the interpolation is not performed thereon. Needless to say, depending on images and patterns, the opposite, i.e., pattern to be determined to mismatch in ordinary pattern matching may be determined to match by defining a priority relationship between attribute groups and interpolation may be performed thereon.

After determining matching of patters, data, namely, interpolation target pixels are selected on this determination result and interpolation and enlargement processing are performed as described above. Definition of a priority relationship between attribute groups allows control of whether or not to interpolate only an attribute group corresponding to the background to be easily performed as shown in FIG. 10. In addition, since color codes are categorized by ranges of addresses, constraints that fonts are preferentially interpolated over graphics or that an outline portion of fonts has priority over a character portion thereof can be provided.

Figure 11:
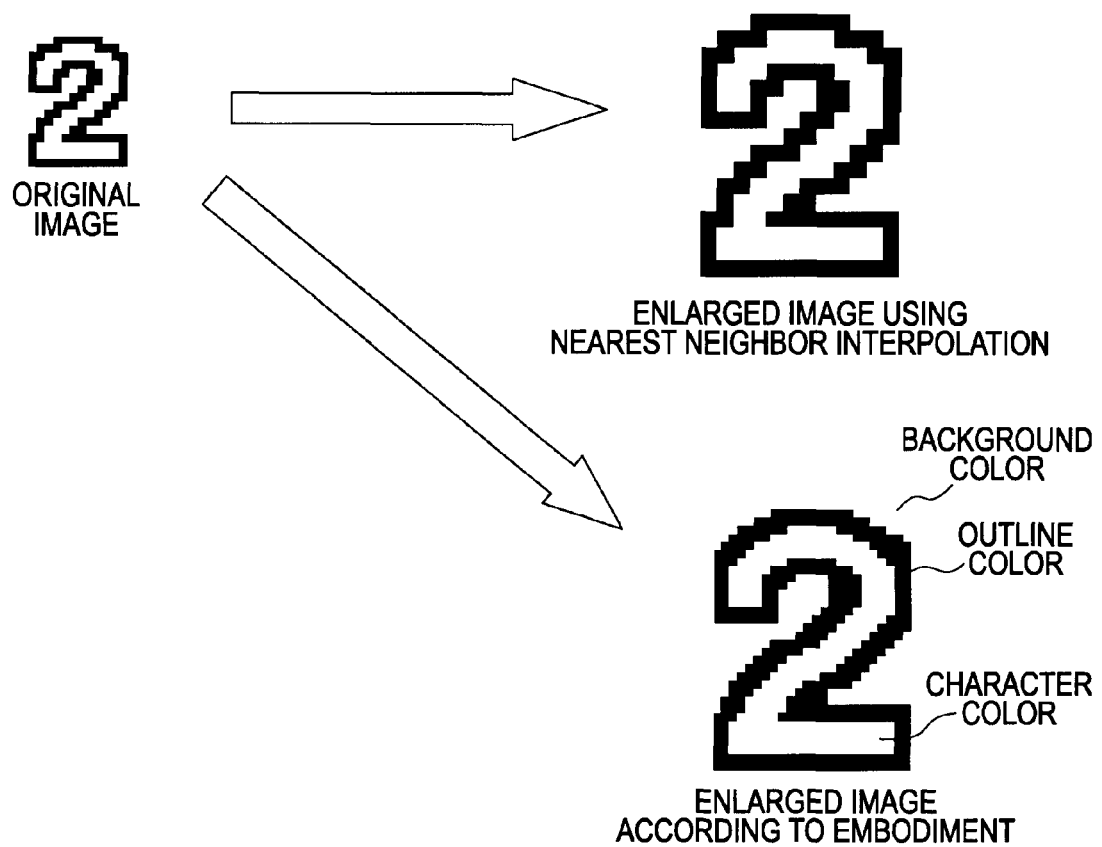
FIG. 11 shows a specific example of an on-screen image interpolated and enlarged using an interpolation and enlargement method after defining a priority relationship between attribute groups.

FIG. 11 shows a specific example of an on-screen image interpolated and enlarged using an interpolation and enlargement method with definition of a priority relationship between attribute groups. Referring to FIG. 11, an original on-screen image includes a font of "2" and one of three kinds of attribute of background colors, outline colors, and character colors is attached to each pixel. FIG. 11 shows a result obtained when a priority relationship of outline colors≧character colors>background colors is assigned. It will be understood that the interpolation and enlargement method according to this embodiment offers a result 1120 in which the curves are smoothened while maintaining the resolution when it is compared with an image 1110 resulting from doubling the original image 1100 in the vertical and horizontal directions using the nearest neighbor interpolation.

The image processing device 10000 shown in FIG. 1 has each line of the above-described interpolation/enlargement section 400. By individually providing a correspondence between color codes and attribute groups and interpolation patterns, the image processing device 10000 can freely sets the interpolation and enlargement processing method for each line.

This means that appropriate interpolation and enlargement processing is performed and various video outputs can be generated from an on-screen image.

Figure 13:
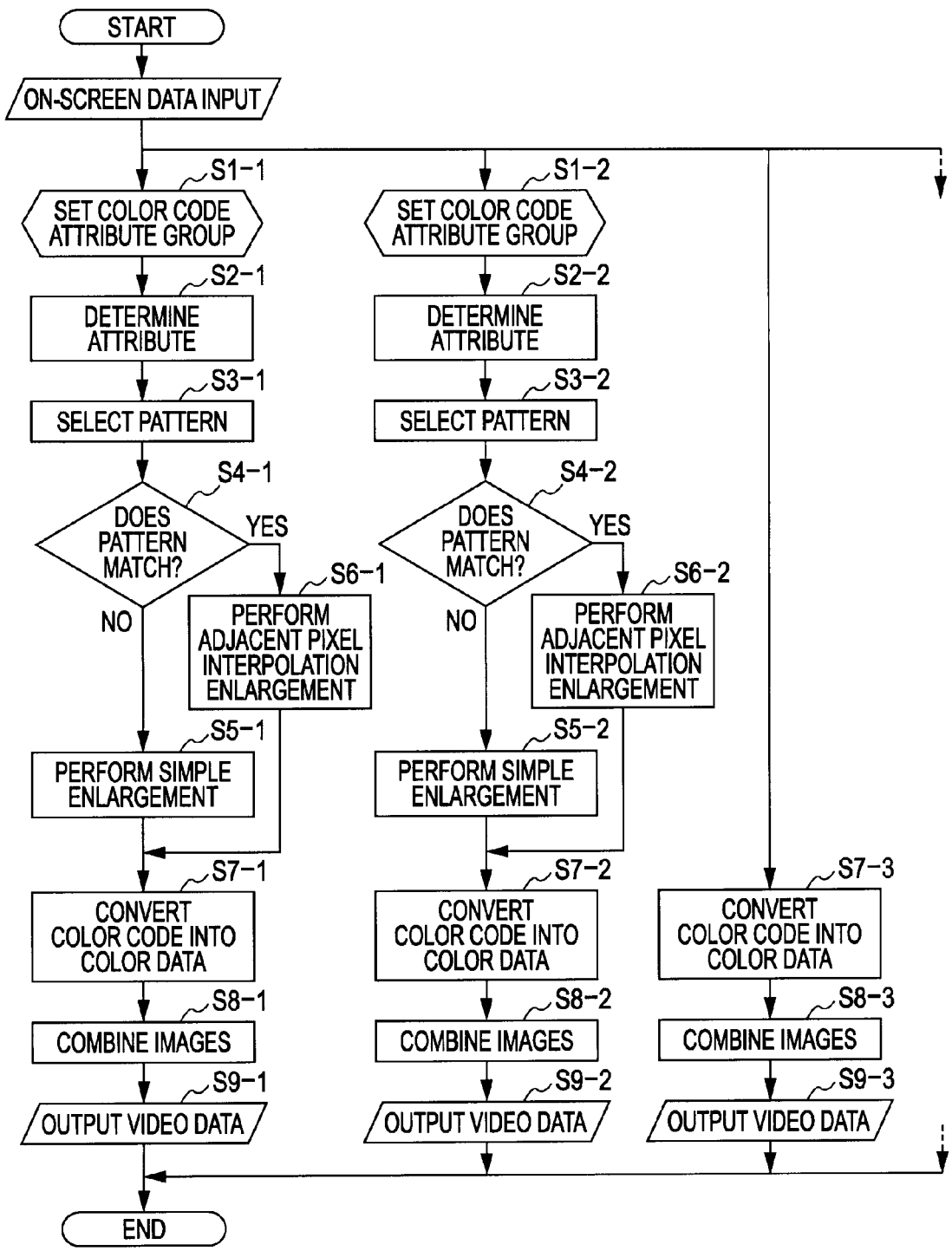
FIG. 13 is a flowchart showing a procedure executed by an image processing device 10000.

FIG. 13 shows a procedure executed by the image processing device 10000 as a flowchart.

Supplied image data is fed to each processing line. In each processing line, an attribute of color codes has been set (STEP S1). The image processing device 10000 determines attribute of a target pixel and neighboring pixels thereof on the basis of color codes (STEP S2).

Subsequently, the image processing device 10000 selects appropriate interpolation patterns from prepared ones according to the determined attribute (STEP S3), and determines whether the input image matches the pattern (STEP S4).

Here, if the input image is determined to mismatch the interpolation pattern (NO of STEP S4), the image processing device 10000 performs simple enlargement processing according to, for example, a known nearest neighbor method (STEP S5). On the other hand, if the input image is determined to match the interpolation pattern (YES of STEP S4), the image processing device 10000 performs interpolation and enlargement processing using adjacent pixels (STEP S6).

The methods for determining matching of patterns and the interpolation methods using adjacent pixels to be employed are those described above. At STEP S6, various methods can be employed on the basis of the attributes of the target pixel and the surrounding pixels.

Subsequently, the color codes of the enlarged result are converted into color information in RGB or YCrCb using the color palette (STEP S7). The image processing device 10000 then combines the obtained image with a video signal, such as an image captured with a camera (STEP S8), and outputs a combined video image (STEP S9).

As described above, the image processing device according to this embodiment can execute interpolation and enlargement processing using highly flexible pattern matching according to the user's preference.

Figure 14:
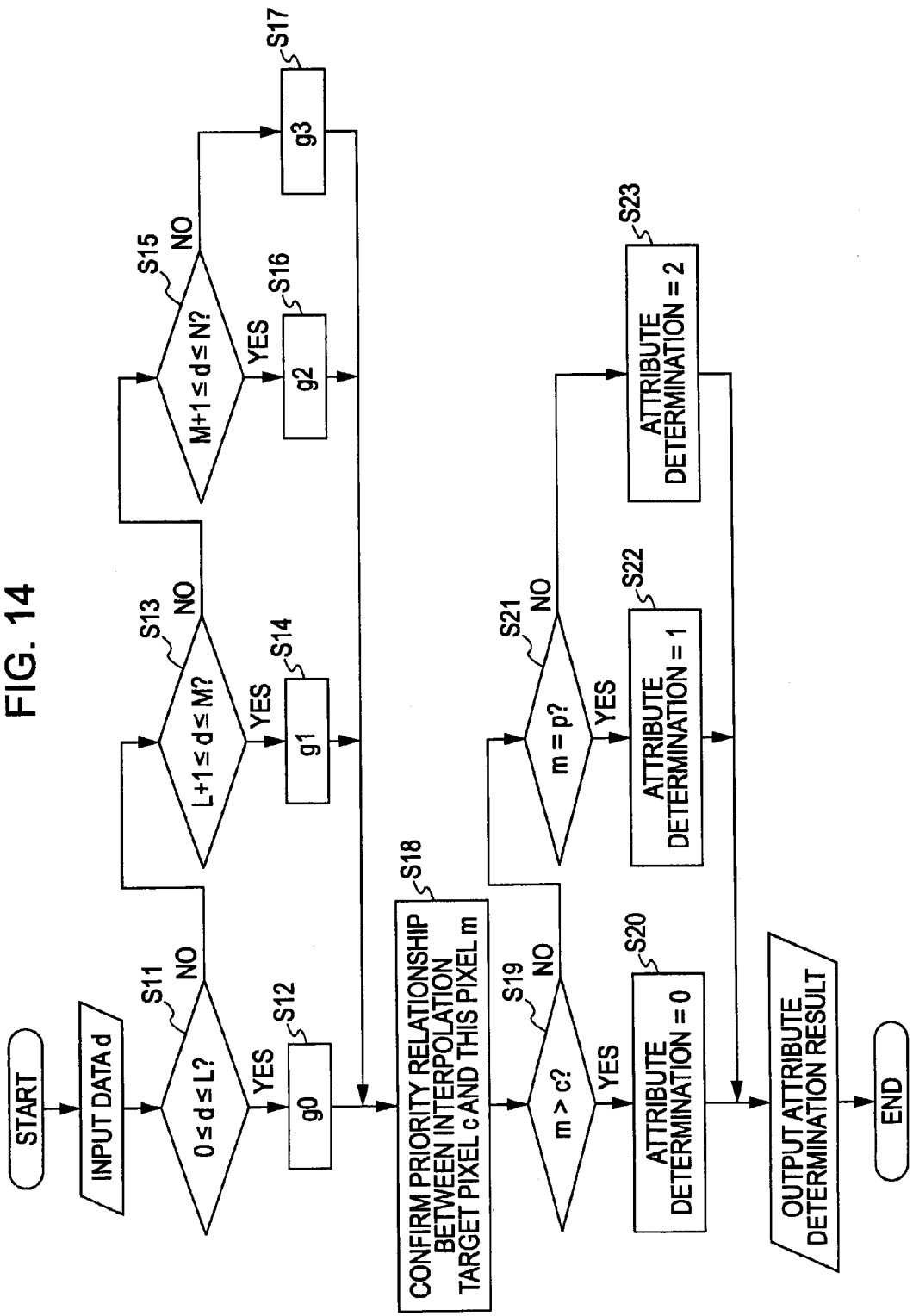
FIG. 14 is a flowchart showing a detailed procedure of attribute determination processing executed at STEP S2 of a flowchart shown in FIG. 13.

FIG. 14 shows a detailed procedure of attribute determining processing executed at STEP S2 (or by the attribute determining unit 4200) of the flowchart shown in FIG. 13 as a flowchart.

Upon being supplied with image data of a pixel and the color code assigned thereto, the attribute determining unit 4200 determines the attribute group for each pixel on the basis of an address range of the color code assigned to each pixel of the input image. More specifically, the attribute determining unit 4200 determines image data d whose address is included in a range of $0 \leq d \leq L$ as an attribute group g0 (STEPs S11 and S12). The attribute determining unit 4200 determines image data d whose address is included in a range of $L+1 \leq d \leq M$ as an attribute group g1 (STEPs S13 and S14), and image data d whose address is included in a range of $M+1 \leq d \leq N$ as an attribute group g2 (STEPs S15 and S16).

Subsequently, the attribute determining unit 4200 confirms a priority relationship between the attribute group m determined for each pixel and the attribute group c determined for the target pixel, which is the interpolation target (STEP S18).

Here, if the attribute group m has a higher priority over the attribute group c of the target pixel (YES of STEP S19), the attribute determining unit 4200 returns 0 as an attribute determination result (STEP S20).

Conversely, if the attribute group m does not have a higher priority over the attribute group c of the target pixel (NO of STEP S19), the attribute determining unit 4200 further compares the attribute group m with a predetermined value p (STEP S21). If the attribute group m is equal to the predetermined value p (YES of STEP S21), the attribute determining unit 4200 returns 1 as the attribute determination result (STEP S22). If the attribute group m is not equal to the predetermined value p (NO of STEP S21), the attribute determining unit 4200 returns 2 as the determination result (STEP S23).

The attribute determining unit 4200 then outputs results, obtained by performing the above-described attribution determination for all of pixels of the input image, to the subsequent processing stage (or the pattern matching determining unit 4300), and terminates this processing routine.

Figure 15:
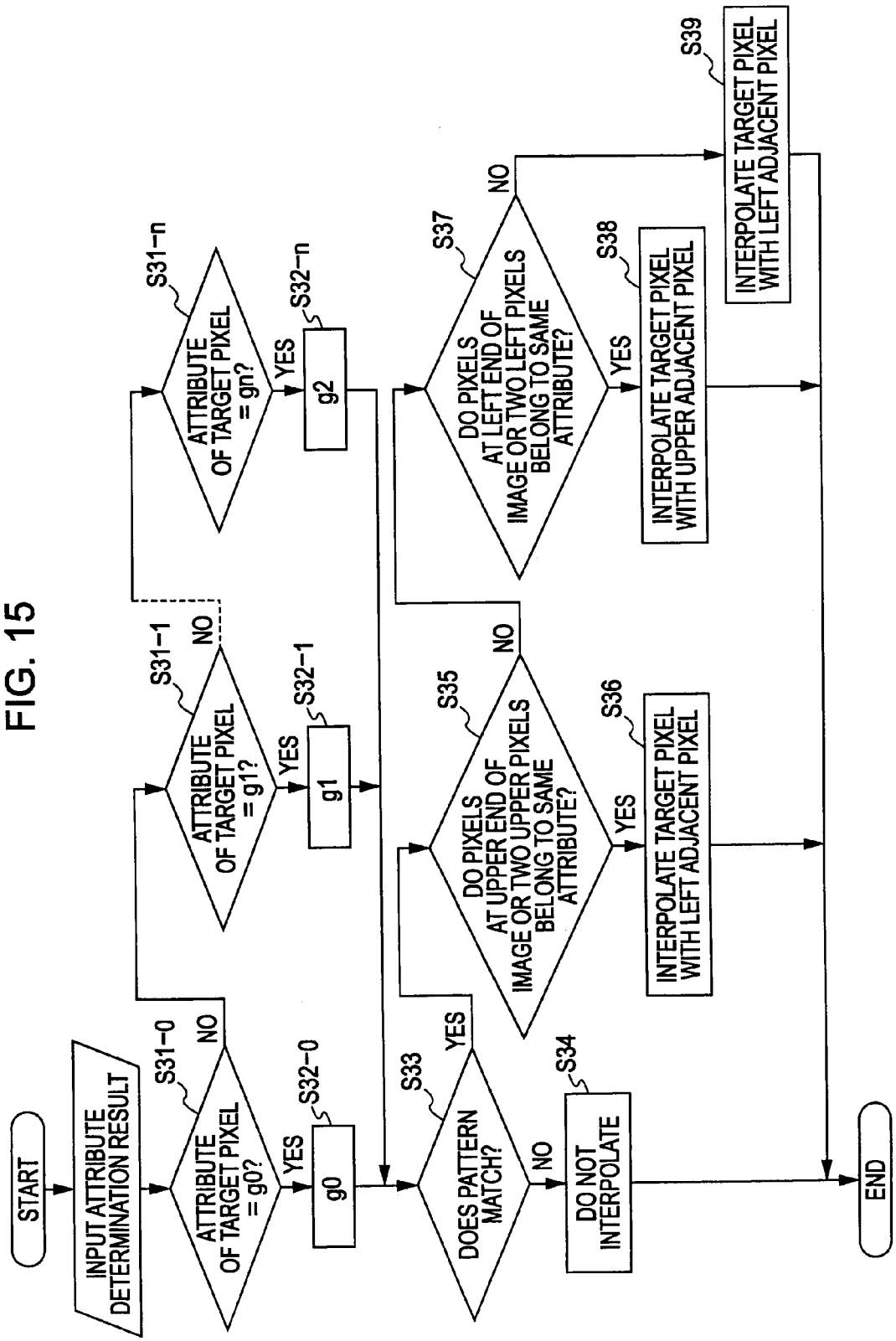
FIG. 15 is a flowchart showing a detailed procedure of pattern matching determination and interpolation data selection executed at STEPs S3 and S4 of a flowchart shown in FIG. 13.

FIG. 15 shows a detailed procedure of pattern matching determining and interpolation data selecting processing executed at STEPs S3 and S4 (or by the pattern matching determining unit 4300 and the data selecting unit 4400) of the flowchart shown in FIG. 13 as a flowchart.

Upon receiving the result obtained by executing the processing of the flowchart shown in FIG. 14 from the attribute determining unit 4200 or the like, the pattern matching determining unit 4300 and the data selecting unit 4400 determine the attribute group to which the attribute value of the current target pixel belongs to, and selects interpolation patterns utilized in the interpolation and enlargement processing according to the determination result. More specifically, when the attribute group of the target pixel is g0, the pattern matching determining unit 4300 selects interpolation patterns for the attribute group g0, and performs pattern matching (STEPs S31-0 and S32-0). When the attribute group of the target pixel is g1, the pattern matching determining unit 4300 selects interpolation patterns for the attribute groups g0 and g1, and performs pattern matching (STEPs S31-1 and S32-1). Similarly, when the attribute group of the target pixel is gn, the pattern matching determining unit 4300 selects interpolation patterns for the attribute groups g0 to gn, and performs pattern matching (STEPs S31-n and S32-n).

If the image is determined to mismatch the interpolation patterns selected according to the attribute group as a result of the pattern matching (NO of STEP S33), the data selecting unit 4400 decides not to perform interpolation on the target pixel (STEP S34).

A range for which whether the image matches the pattern is determined may run off the edge of the processing target image. In such a case, the pattern matching determining unit 4300 determines whether the image matches the interpolation pattern at the edge of the image while assuming the portion outside the image as the background group, and the data selecting unit 4400 appropriately changes the position of a pixel used in the interpolation, thereby interpolating pixels at the edge of the image.

In addition, when the target pixel is doubled in the vertical and horizontal directions, a pixel to be interpolated with an adjacent pixel is an upper left one among four pixels in a 2×2 matrix. However, the position of a pixel to be referred to for the interpolation of the pixel data is adaptively switched according to the arrangement of background colors.

More specifically, if the two pixels at the upper edge of the image or on the upper side (YES of STEP S35) have the same pixel data, the data selecting unit 4400 decides to interpolate the interpolation target pixel with a left adjacent pixel (STEP S36).

In addition, if two pixels at the left edge of the image or on the left have the same pixel data (YES of STEP S37), the data selecting unit 4400 decides to interpolate the interpolation target pixel with an upper adjacent pixel (STEP S38). In the other cases (NO of STEP S37), the data selecting unit 4400 decides to interpolate the interpolation target pixel with a left adjacent pixel (STEP S39).

The data selecting unit 4400 then outputs the result, obtained by performing the pattern matching determination using each pixel of the input image as a target pixel, to a subsequent processing stage, and terminates this processing routine.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device for enlarging an image, comprising:
   an attribute determining unit for determining an attribute of each pixel constituting an input image;
   a pattern matching determining unit for determining whether a pattern of the input image, constituted by a target pixel and target-pixel-neighboring pixels that are determined to have the same attribute, matches a predetermined interpolation pattern while assuming each pixel of the input image as the target pixel; and
   a data selecting unit for selecting pixel data for each of N×N pixels, obtained by enlarging the target pixel N-times, on the basis of the result of the matching determination performed by the pattern matching determining unit, where N is an integer equal to or greater than 2,
   wherein
   the input image is constituted by an artificial image to be superimposed on a video signal, and wherein
   the attribute determining unit determines whether or not each pixel of the input image has an attribute indicating the artificial image, and wherein
   the pattern matching determining unit determines matching of the input image and the interpolation pattern while assuming each of the pixels, determined to have the attribute indicating the artificial image by the attribute determining unit, of the input image as the target pixel.

2. The image processing device according to Claim 1, wherein
   the attribute determining unit determines a plurality of attributes regarding an artificial image;
   the pattern matching determining unit categorizes the plurality of attributes into attribute groups, and prepares interpolations patterns corresponding to each attribute group, and determines matching of the input image and the interpolation pattern using the interpolation patterns corresponding to the attribute group to which the attribute determined for the target pixel belongs.

3. The image processing device according to claim 2, wherein
   color codes of pixel data constituting an artificial image are categorized according to ranges of addresses corresponding to attribute groups, wherein
   the attribute determining unit determines the attribute group on the basis of the address range of the color code of each of the pixels of the input image.

4. The image processing device according to claim 3, wherein the pattern matching determining unit defines a priority relationship between attribute groups.

5. The image processing device according to claim 1, further comprising:
   a color palette for converting the color code of each pixel into pixel data in RGB or YCrCb; and
   an image combining unit for superimposing the input image having been converted to image data on a background video signal, wherein
   the data selecting unit selects whether to assign a color code of the original pixel to each of the N×N pixels, obtained by enlarging the target pixel, having been determined to match the interpolation pattern by the pattern matching determining unit, N-times, or to interpolate each of the N×N pixels with pixel data of an adjacent pixel.

6. An image processing device for enlarging an image, comprising:
   an attribute determining unit for determining an attribute of each pixel constituting an input image;

a pattern matching determining unit for determining whether a pattern of the input image, constituted by a target pixel and target-pixel-neighboring pixels that are determined to have the same attribute, matches a predetermined interpolation pattern while assuming each pixel of the input image as the target pixel; and a data selecting unit for selecting pixel data for each of N×N pixels, obtained by enlarging the target pixel N-times, on the basis of the result of the matching determination performed by the pattern matching determining unit, where N is an integer equal to or greater than 2, wherein, when a range for which whether the image matches the pattern is determined runs off the edge of the image to be processed, the pattern matching determining unit determines whether the input image matches the interpolation pattern at the edge of the image while assuming the portion outside the image as the background, and wherein the data selecting unit appropriately changes the position of a pixel used in the interpolation.

7. An image processing device for enlarging an image, comprising:

an attribute determining unit for determining an attribute of each pixel constituting an input image;

a pattern matching determining unit for determining whether a pattern of the input image, constituted by a target pixel and target-pixel-neighboring pixels that are determined to have the same attribute, matches a predetermined interpolation pattern while assuming each pixel of the input image as the target pixel; and a data selecting unit for selecting pixel data for each of N×N pixels, obtained by enlarging the target pixel N-times, on the basis of the result of the matching determination performed by the pattern matching determining unit, where N is an integer equal to or greater than 2, wherein the data selecting unit adaptively switches the position of a pixel to be referred to for interpolating pixel data of the interpolation target pixel of the enlarged target pixel according to arrangement of background colors adjacent to the target pixel.

8. The image processing device according to claim 7, wherein the data selecting unit selects a pixel located on the upper side of the target pixel as the pixel to be referred to when two kinds of background colors are arranged adjacent to the target pixel in the horizontal direction.

9. The image processing device according to claim 7, wherein the data selecting unit selects a pixel located on the left side of the target pixel as the pixel to be referred to when two kinds of background colors are arranged adjacent to the target pixel in the vertical direction.

10. An image processing method for enlarging an image, the method comprising:

an attribute determining step of determining an attribute of each pixel constituting an input image;

a pattern matching determining step of determining whether a pattern of the input image, constituted by a target pixel and target-pixel-neighboring pixels that are determined to have the same attribute, matches a predetermined interpolation pattern while assuming each pixel of the input image as the target pixel; and a data selecting step of selecting pixel data for each of N×N pixels, obtained by enlarging the target pixel N-times, on the basis of the result of the matching determination obtained at the pattern matching determining step, where N is an integer equal to or greater than 2, wherein the input image is constituted by an artificial image to be superimposed on a video signal, and wherein the attribute determining step determines whether or not each pixel of the input image has an attribute indicating the artificial image, and wherein the pattern matching determining step determines matching of the input image and the interpolation pattern while assuming each of the pixels, determined to have the attribute indicating the artificial image by the attribute determining unit, of the input image as the target pixel.

11. A non-transitory computer readable storage device having computer readable instructions that when executed by a computer processor causes a computer to execute an image processing method for enlarging an image, the method comprising:

an attribute determining step of determining an attribute of each pixel constituting an input image;

a pattern matching determining step of determining whether a pattern of the input image, constituted by a target pixel and target-pixel-neighboring pixels that are determined to have the same attribute, matches a predetermined interpolation pattern while assuming each pixel of the input image as the target pixel; and a data selecting step of selecting pixel data for each of N×N pixels, obtained by enlarging the target pixel N-times, on the basis of the result of the matching determination obtained by performing the pattern matching determining step, where N is an integer equal to or greater than 2, wherein the input image is constituted by an artificial image to be superimposed on a video signal, and wherein the attribute determining strep determines whether or not each pixel of the input image has an attribute indicating the artificial image, and wherein the pattern matching determining step determines matching of the input image and the interpolation pattern while assuming each of the pixels, determined to have the attribute indicating the artificial image by the attribute determining unit, of the input image as the target pixel.

* * * * *